United States Patent
Sporck et al.

(10) Patent No.: US 9,590,436 B2
(45) Date of Patent: Mar. 7, 2017

(54) MASTER-SLAVE MULTI-PHASE CHARGING

(71) Applicant: QUALCOMM Incorporated, San Diego, CA (US)

(72) Inventors: Christian Sporck, Campbell, CA (US); Giovanni Garcea, San Jose, CA (US); Shadi Hawawini, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 14/251,206

(22) Filed: Apr. 11, 2014

(65) Prior Publication Data
US 2014/0347003 A1 Nov. 27, 2014

Related U.S. Application Data

(63) Continuation-in-part of application No. 14/065,752, filed on Oct. 29, 2013, now Pat. No. 9,276,430.

(60) Provisional application No. 61/827,443, filed on May 24, 2013.

(51) Int. Cl.
*H02J 7/00* (2006.01)
*H02J 1/10* (2006.01)
*H02J 7/04* (2006.01)
*H02J 7/02* (2016.01)

(52) U.S. Cl.
CPC ............ *H02J 7/0052* (2013.01); *H02J 1/102* (2013.01); *H02J 7/022* (2013.01); *H02J 7/045* (2013.01); *H02J 7/0029* (2013.01); *H02J 2007/0059* (2013.01)

(58) Field of Classification Search
CPC .......... H02J 7/0052; H02J 7/022; H02J 1/102; H02J 7/045; H02J 7/0029; H02J 2007/0059
See application file for complete search history.

(56) References Cited

U.S. PATENT DOCUMENTS

| | | | | |
|---|---|---|---|---|
| 4,607,208 A | * | 8/1986 | Vreeland | H02J 7/0085 320/145 |
| 7,135,836 B2 | | 11/2006 | Kutkut et al. | |
| 7,290,126 B2 | * | 10/2007 | Yamakawa | G06F 1/206 375/238 |
| 7,394,671 B2 | * | 7/2008 | Fukumoto | H02M 7/53806 363/134 |

(Continued)

FOREIGN PATENT DOCUMENTS

| | | |
|---|---|---|
| EP | 1870979 A1 | 12/2007 |
| JP | H1028338 A | 1/1998 |

(Continued)

OTHER PUBLICATIONS

International Search Report and Written Opinion—PCT/US2014/034002—ISA/EPO—Aug. 5, 2014.

(Continued)

*Primary Examiner* — Naum B Levin
(74) *Attorney, Agent, or Firm* — Haynes and Boone, LLP

(57) ABSTRACT

A battery charging circuit comprises two or more charging circuits, each capable of charging a battery. The charging outputs of the charging circuits are connected together and can be connected to a battery to provide fast charging of the battery. The charging circuits can be configured so that they do not adversely interfere with each other during battery charging.

22 Claims, 23 Drawing Sheets

(56) References Cited

U.S. PATENT DOCUMENTS

| | | | |
|---|---|---|---|
| 7,656,132 B2 * | 2/2010 | So | H01M 10/44 320/134 |
| 7,759,919 B2 * | 7/2010 | Bernacchia | H02M 3/1584 323/272 |
| 7,777,455 B1 * | 8/2010 | Martin | H02J 7/0055 320/137 |
| 7,777,462 B2 * | 8/2010 | Kudo | H02M 3/1584 323/272 |
| 7,778,049 B2 * | 8/2010 | Morota | H02M 3/33507 363/21.12 |
| 8,120,205 B2 * | 2/2012 | Heineman | G06F 1/26 307/52 |
| 8,319,478 B2 * | 11/2012 | Humphrey | B60L 3/0069 320/138 |
| 8,441,235 B2 | 5/2013 | Shi et al. | |
| 8,482,340 B2 | 7/2013 | Shay et al. | |
| 8,497,666 B2 * | 7/2013 | Nagasawa | H02M 3/1584 323/238 |
| 2004/0189251 A1 * | 9/2004 | Kutkut | H02J 7/022 320/128 |
| 2004/0212347 A1 | 10/2004 | Fogg | |
| 2007/0076453 A1 | 4/2007 | Schultz et al. | |
| 2007/0291523 A1 * | 12/2007 | Fukumoto | H02M 7/53806 363/134 |
| 2009/0160407 A1 | 6/2009 | Hwang | |
| 2011/0110130 A1 | 5/2011 | Wang et al. | |
| 2011/0169471 A1 | 7/2011 | Nagasawa | |
| 2012/0038324 A1 * | 2/2012 | Humphrey | B60L 3/0069 320/138 |
| 2012/0181983 A1 | 7/2012 | Khan et al. | |
| 2014/0139176 A1 * | 5/2014 | Ji | H02J 7/0081 320/107 |
| 2014/0266010 A1 * | 9/2014 | Newlin | H02J 7/0052 320/107 |
| 2014/0347001 A1 | 11/2014 | Sporck et al. | |

FOREIGN PATENT DOCUMENTS

| | | |
|---|---|---|
| JP | 2011176959 A | 9/2011 |
| JP | 2012115006 A | 6/2012 |
| WO | 2011143158 A2 | 11/2011 |

OTHER PUBLICATIONS

Wang J.B., et al., "Design Considerations of Microprocessor-Controlled Multiphase Battery Charger with Fast-Charging Strategy," IET Electric Power Applications, Mar. 2007, pp. 143-152, vol. 1 (2).

* cited by examiner

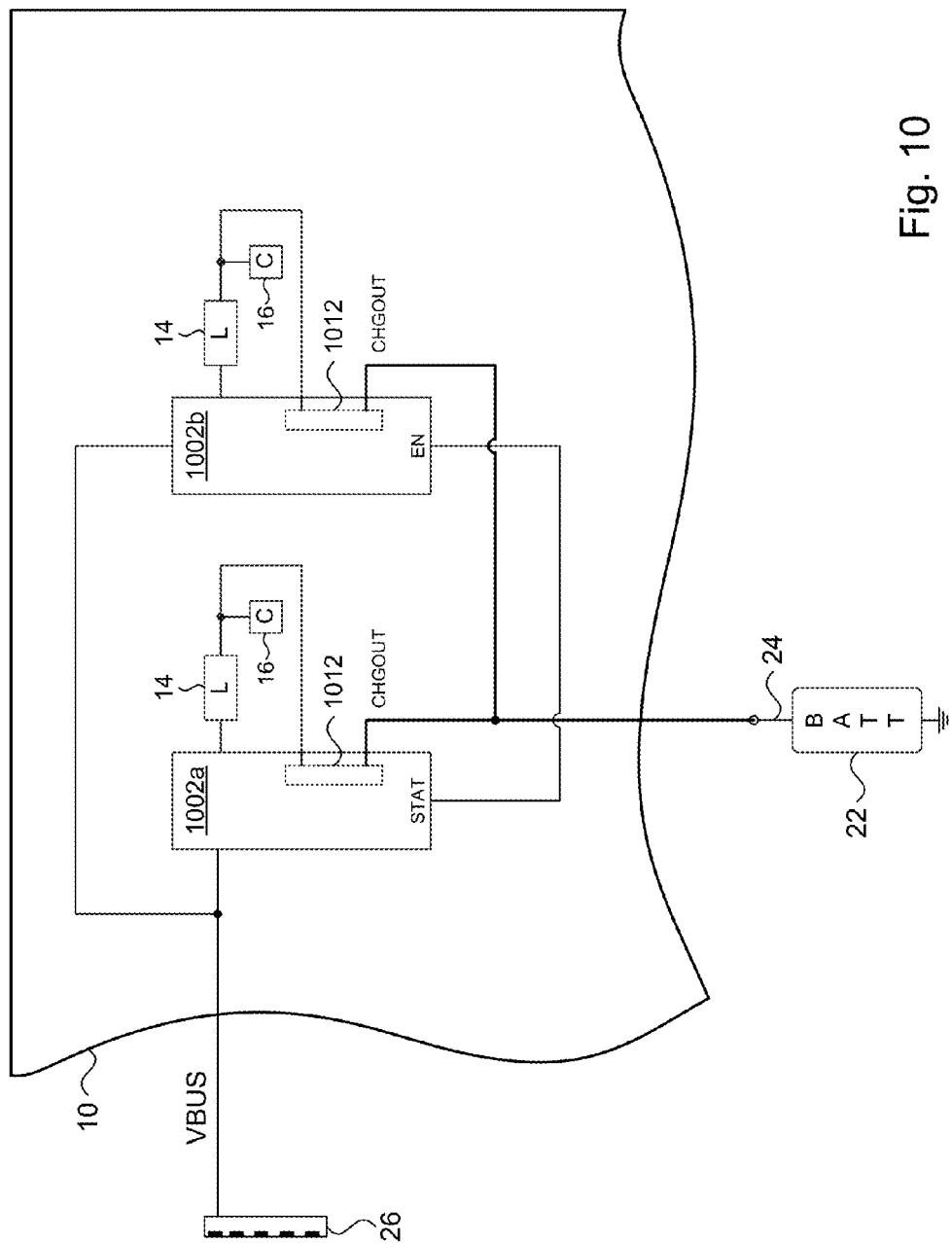

MASTER-SLAVE MULTI-PHASE CHARGING

CROSS REFERENCE TO RELATED APPLICATIONS

This application is a continuation-in-part application and is entitled to and claims the benefit of earlier filed application U.S. application Ser. No. 14/065,752 filed Oct. 29, 2013 now U.S Pat. No 9,276,430 issued Mar. 1, 2016 which, in turn, is entitled to and claims the benefit of the filing date of U.S. Provisional App. No. 61/827,443 filed May 24, 2013, the contents of all of which are incorporated herein by reference in their entirety for all purposes.

BACKGROUND

Unless otherwise indicated herein, the approaches described in this section are not prior art to the claims in this application and are not admitted to be prior art by inclusion in this section.

As mobile computing devices (e.g., smart phones, computer tablets, and the like) continue to be used more widely, the need for fast charging of batteries becomes more significant. Advancements in fast battery charging techniques are being hampered by the high temperatures that result during fast charge sequences. In most cases, the high temperatures are caused by high inductor temperatures, which can exceed the temperature of the charging circuit.

SUMMARY

The present disclosure describes a battery charging circuit comprising a first charging circuit and a second charging circuit. Charging outputs of the charging circuits may be connected together, and connectable to a battery for charging. The first charging circuit may be configured with a battery threshold voltage higher than that of the second charging circuit, in order that a battery charging operation in the second charging circuit can terminate before a battery charging operation in the first charging circuit.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings:

FIGS. 10 and 10A show printed circuit board (PCB) level embodiments in accordance with the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
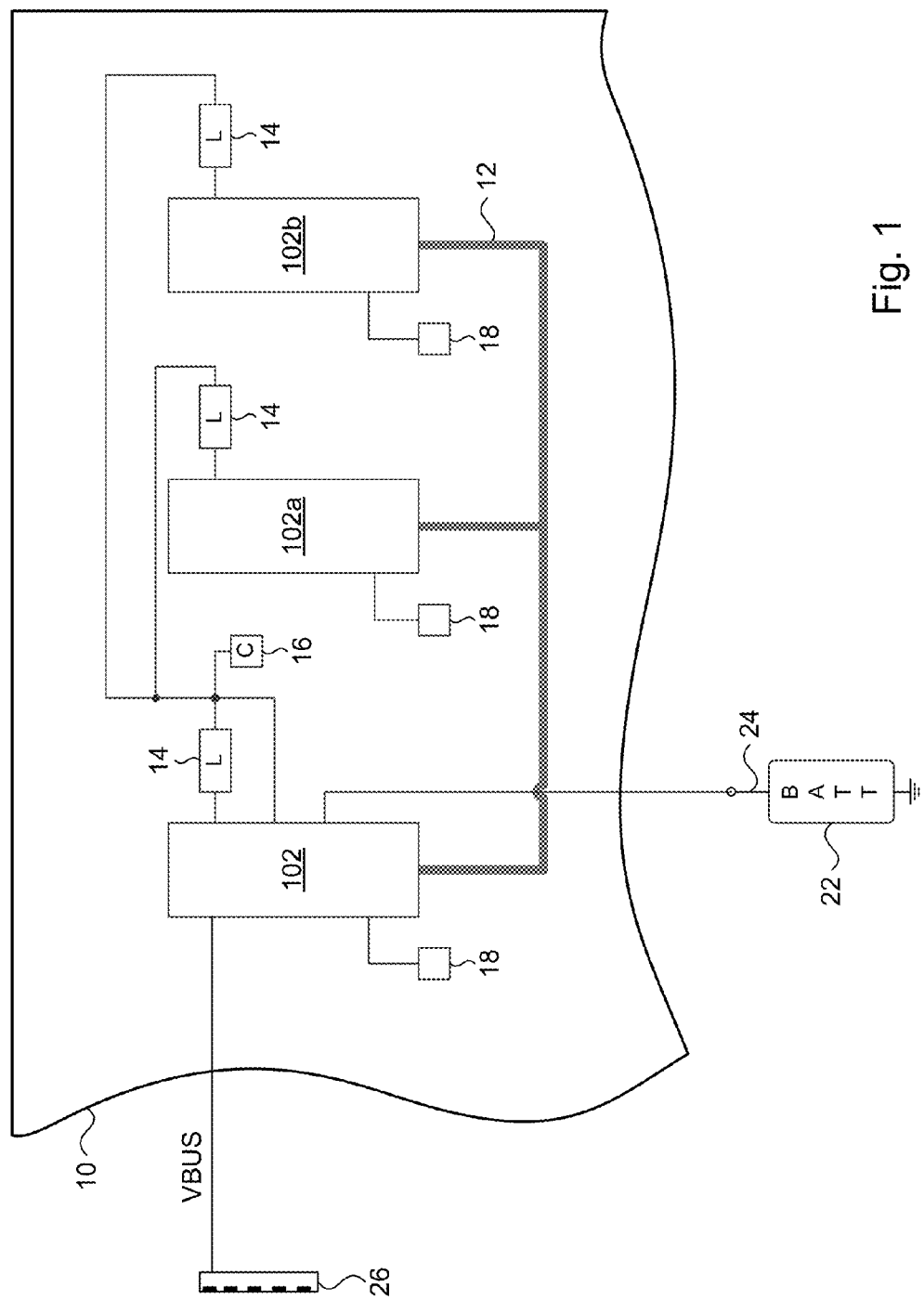
FIG. 1 shows a printed circuit board (PCB) level embodiment of the present disclosure.

FIG. 1 shows a portion of a printed circuit board (PCB) 10 populated with battery charging devices in accordance with the present disclosure. The PCB 10 may be a circuit board, for example, in a mobile computing device, a smart phone, and in general any electronic device. The PCB 10 may be populated with battery charging devices 102, 102a, 102b. It will be appreciated in the discussions to follow that fewer or more battery charging devices may be provided. Each of the battery charging devices 102, 102a, 102b may be embodied in any suitable integrated circuit (IC) packaging format (e.g., single in-line packaging, dual in-line packaging, surface mount devices, and so on) and interconnected on the PCB 10.

In some embodiments, the battery charging devices 102, 102a, 102b are identical devices that can be configured for different modes of operation. For example, device 102 may be configured for "master" mode operation, while devices 102a, 102b may be configured for "slave" mode operation. It will be understood that battery charging devices 102, 102a, 102b may include pins or terminals (not shown) that allow the devices to be interconnected on the PCB 10 using PCB traces, represented generally by 12.

In accordance with principles of the present disclosure, the battery charging devices 102, 102a, 102b may be connected to a battery 22 via a connection 24 (e.g., battery terminal) for coordinated charging of the battery by the battery charging devices. The battery 22 may comprise any known configuration of one or more cells (e.g., a single-cell configuration, a multi-cell, multi-stack configuration, etc.) and may be use any suitable chemistry that allows for recharging.

In some embodiments, the battery charging devices 102, 102a, 102b operate as buck converters, and in other embodiments the battery charging devices may comprise buck-boost converters. In some embodiments, the inductive component of the buck converter may be provided as external inductive elements 14 provided on the PCB 10. Accordingly, each battery charging device 102, 102a, 102b may be connected to a corresponding external inductive element 14, such as an inductor. The inductive elements 14 are "external" in the sense that they are not part of the charging ICs that comprise the battery charging devices 102, 102a, 102b. In accordance with the present disclosure, the capacitive component of the buck converters may be provided as an external capacitive element 16 on the PCB 10 that can be shared by each battery charging device 102, 102a, 102b. The capacitive element 16 is "external" in the sense that it is not part of the charging ICs that comprise the battery charging devices 102, 102a, 102b.

Further in accordance with the present disclosure, each battery charging device 102, 102a, 102b may be connected to a corresponding external selection indicator 18 to configure the device for master or slave mode operation. Each selection indicator 18 is "external" in the sense that it is not part of the charging IC that comprises the device. In some embodiments, the selection indicator 18 may be a resistive element. For example, a connection to ground potential (e.g., approximately 0Ω) may serve to indicate the device (e.g., 102) should operate in master mode. A non-zero resistance value (e.g., 10 KΩ, 100 KΩ, etc.) may serve to indicate that the device (e.g., 102a, 102b) should operate in slave mode. More generally, in other embodiments, the selection indicator 18 may be a source of a suitable analog signal or digital signal that can serve to indicate to the device 102, 102a, 102b whether to operate in master mode or slave mode.

Power to the battery charging devices 102, 102a, 102b may be externally provided via any suitable connector 26. Merely as an example, the connector 26 may be a USB connector. Power from the VBUS line of a USB connector may be connected to device 102 (e.g., at a USBIN terminal), which may then distribute the power to the other devices 102a, 102b via a MIDUSBIN terminal These and other terminals will be described in more detail below.

Figure 1A:
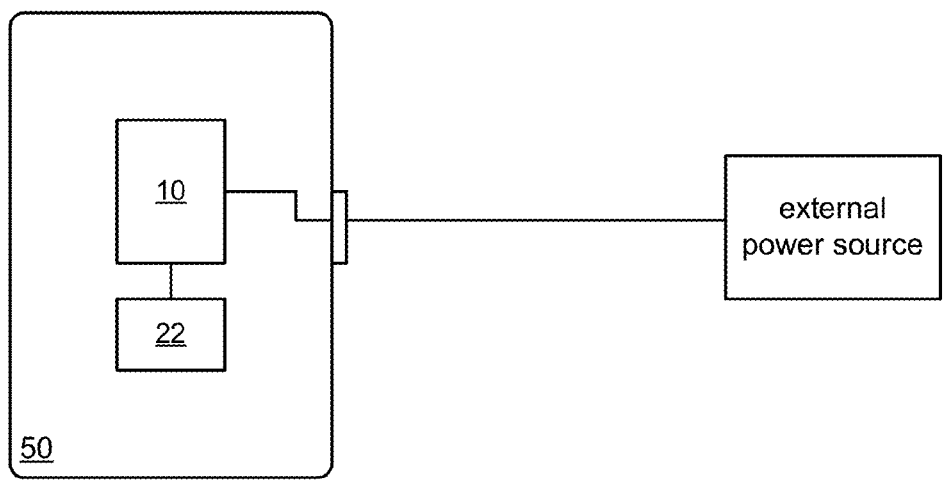
FIGS. 1A and 1B show additional illustrative embodiments in accordance with the present disclosure.
Figure 1B:
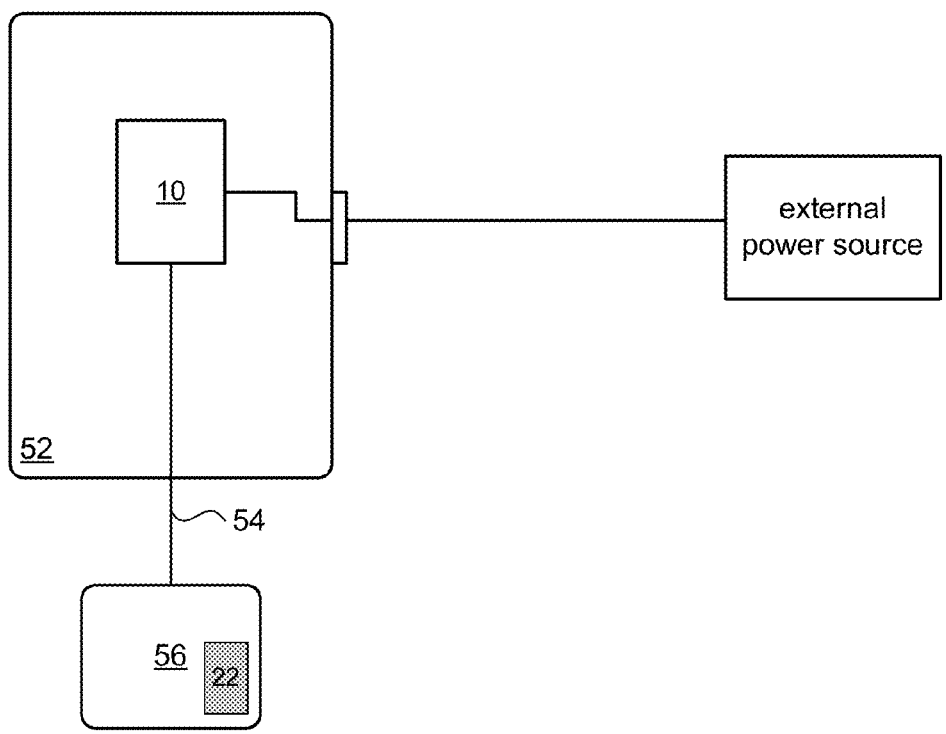

One of ordinary skill will appreciate that embodiments according to the present disclosure may include any electronic device. For example, FIG. 1A points out that the PCB 10 may be incorporated in any electronic device 50 to charge battery 22. FIG. 1B illustrates another configuration in which PCB 10 may be provided in a first electronic device 52 that has a connection 54 to a second electronic device 56 to charge battery 22 in the second electronic device. In some embodiments, the connection 54 may not be physical, for example, wireless energy transfer from device 52 may be provided using magnetic induction circuitry (not shown).

Figure 2:
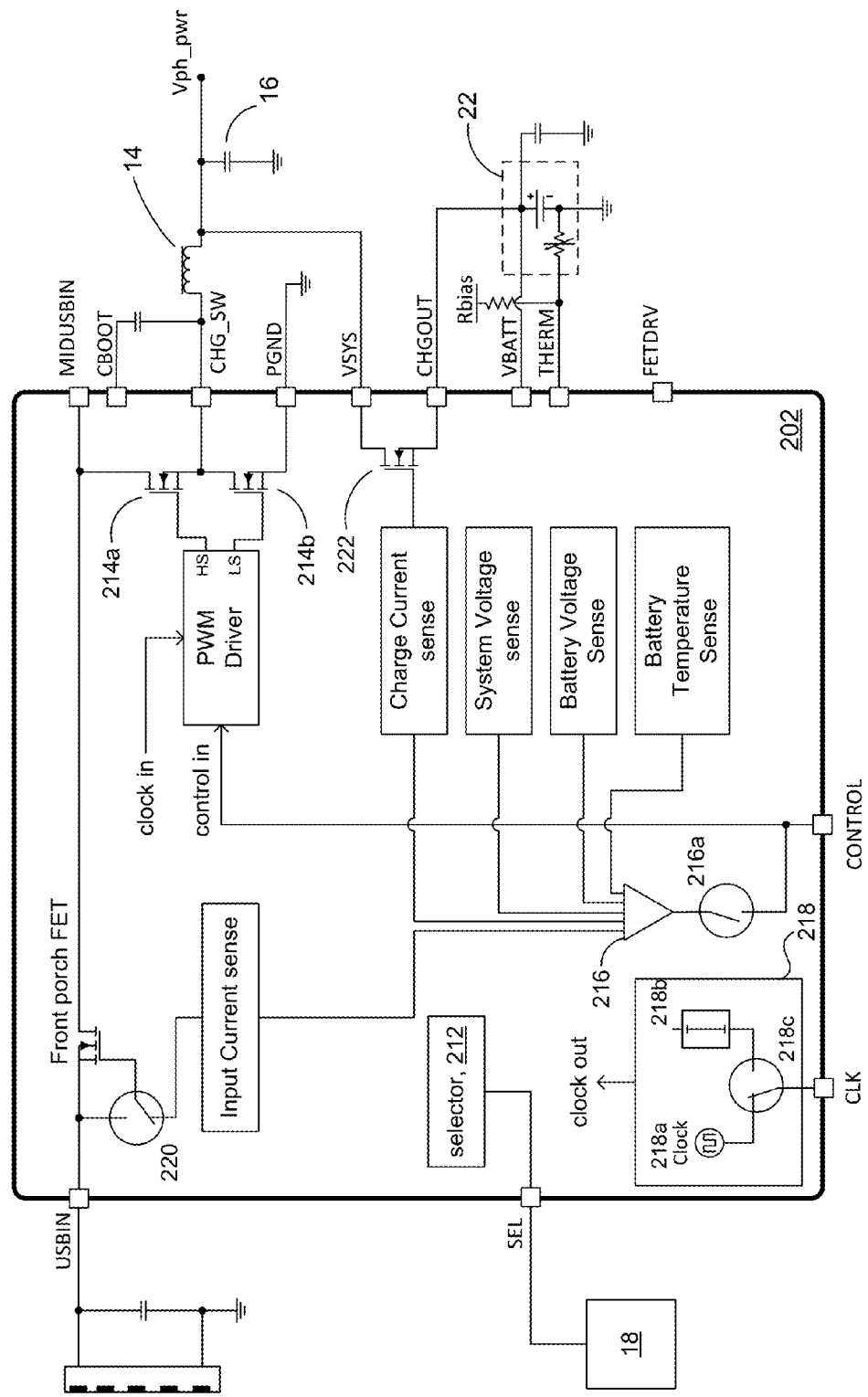
FIG. 2 shows a general view of a charging circuit in accordance with the present disclosure.

The discussion will now turn to details of battery charging device 102 in accordance with some embodiments of the present disclosure. FIG. 2 shows a simplified schematic representation of the battery charging device 102. In some embodiments, the battery charging device 102 may comprise a charging IC 202. It will be appreciated that in some implementations, the design of the charging IC may be implemented on two or more ICs. For purposes of discussion, however, we can assume a single charging IC implementation without loss of generality.

The charging IC 202 may comprise circuitry to provide battery charging functionality in accordance with principles of the present disclosure. In some embodiments, for example, the battery charging functionality may be provided using a buck converter, or a buck-boost converter, and so on. Accordingly, the charging IC 202 may include a high-side FET 214a and a low-side FET 214b that can be configured in a buck converter topology in conjunction with inductive element 14 and capacitive element 16.

A pulse width modulated (PWM) driver circuit may produce gate drive signals (HS, LS) at its switching output to switch the gates of respective FETs 214a and 214b. The PWM driver circuit may receive a current-mode control signal at its control input and a clock signal at its clock input to control the switching of FETs 214a and 214b. Power (Vph_pwr) from the buck converter may be connected to charge the battery 22 through battery FET 222 via the VSYS and CHGOUT terminals of the charging IC 202. The battery FET 222 may serve to monitor the charge current (e.g., using a charge current sense circuit).

In accordance with principles of the present disclosure, the control signal may be internally generated within the charging IC 202 or externally provided to the charging IC. For example, a feedback compensation network comprising various feedback control loops and a comparator 216 may serve as a source of an internally generated control signal. In a particular embodiment, the feedback control loops may include an input current sense circuit (e.g., senses input current at USBIN), a charge current sense circuit (e.g., senses current at VSYS and CHGOUT terminals using battery FET 222), a system voltage sense circuit (e.g., senses voltage at VSYS terminal), a battery voltage sense circuit (e.g., senses battery voltage at VBATT terminal), and a battery temperature sense circuit (e.g., senses battery temperature at THERM terminal). In other embodiments, the feedback control loops may comprise fewer, or additional, sense circuits. The comparator 216 may produce a reference that serves as the internally generated control signal.

The control signal produced by comparator 216 is "internal" in the sense that the control signal is generated by circuitry that comprise the charging IC 202. By comparison, a control signal is considered to be "externally" provided when the signal is received from a source external to the charging IC 202; e.g., via the CONTROL terminal of the charging IC. In some embodiments, a control selector 216a may be provided to select either the internal control signal generated by the comparator 216 or an externally generated control signal received on the CONTROL terminal to serve as the control signal for the PWM driver circuit.

In accordance with principles of the present disclosure, the clock signal may be internally generated within the charging IC 202 or externally provided to the charging IC. For example, the charging IC 202 may include a clock generator 218 to produce a clock signal (clock out). The clock generator 218 may include a clock generating circuit 218a and a delay element 218b. The clock generating circuit 218a may produce a clock signal that serves as an internally generated clock signal. The delay element 218b may receive an externally provided clock signal.

The clock signal produced by the clock generating circuit 218a is "internal" in the sense that the clock signal is generated by circuitry that comprise the charging IC 202, namely the clock generating circuit. By comparison, a clock signal is considered to be "externally" provided when the signal is received from a source external to the charging IC 202; e.g., via the CLK terminal of the charging IC. In some embodiments, a clock selector 218c may be provided to select either the internal clock signal generated by the clock generating circuit 218a or an external clock signal provided on the CLK terminal and delayed (phase shifted) by the delay element 218b to serve as the clock signal for the PWM driver circuit.

The charging IC 202 may include a selector circuit 212 to configure the charging IC to operate in "master" mode or "slave" mode according to the external selection indicator 18 provided on an SEL input of the charging IC. The selection indicator 18 may be a circuit, or a source of an analog signal (e.g., an analog signal generator) or a digital signal (e.g., digital logic). In some embodiments, for example, the selection indicator 18 may be an electrical connection to ground potential, either directly or through a resistive element. The selector circuit 212 may operate the control selector 216a and the clock selector 218c according to the selection indicator 18. The selector circuit 212 may also operate a switch 220 to enable or disable sensing of the current input in accordance with the selection indicator 18.

Figure 3:
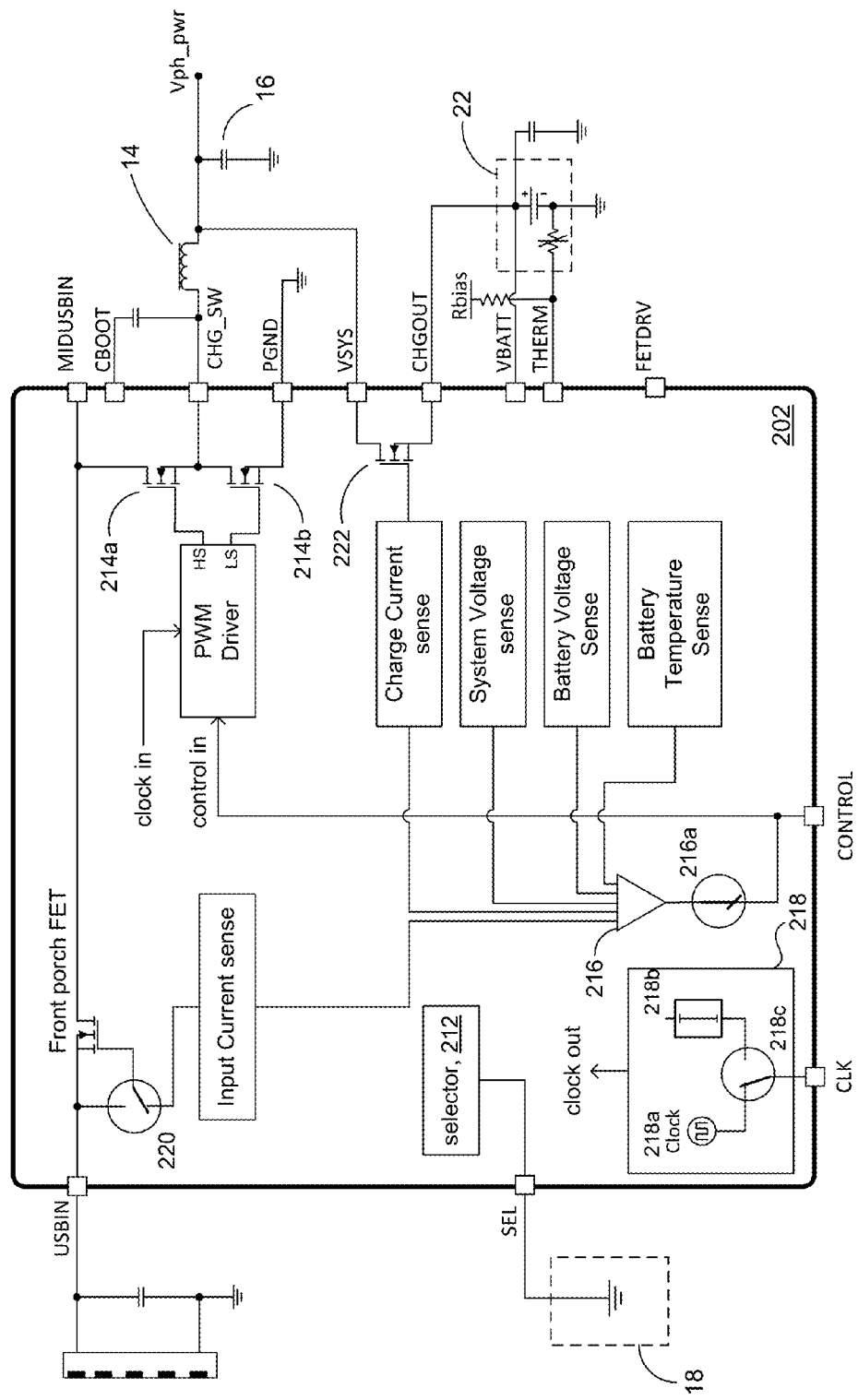
FIG. 3 shows a single-phase configuration of a charging circuit in accordance with the present disclosure.

In accordance with the present disclosure, the charging IC 202 may be configured as a single-phase standalone device, or used in a multi-phase configuration. The discussion will first describe a single-phase configuration. FIG. 3 illustrates an example of the charging IC 202 configured to operate as a standalone battery charger. The charging IC 202 may be configured using the SEL input to operate in master mode. In some embodiments, master mode operation in charging IC 202 may be designated by a selection indicator 18 that comprises a connection of the SEL input to ground potential. This convention for designating master mode operation will be used for the remainder of the disclosure with the understanding that, in other embodiments, other conventions may be adopted to indicate master mode operation.

In an embodiment, the selector 212 may be configured to respond to the presence of a ground connection at the SEL input by configuring the charging IC 202 for master mode operation. For example, the selector 212 may operate the control selector 216a in a first configuration to provide an internally generated control signal to the control input of the PWM driver circuit. The internally generated control signal is also provided to the CONTROL terminal of charging IC 202, which for the single-phase configuration shown in FIG. 3 is not relevant.

Similarly, the selector 212 may operate the clock selector 218c in a first configuration to provide an internally generated clock signal (e.g., via clock generating circuit 218a) to the clock input of the PWM driver circuit. The internally generated clock signal is also provided to the CLK terminal of charging IC 202, which for the single-phase configuration shown in FIG. 3 is not relevant. The selector 212 may also operate switch 220 to a configuration that enables input current sensing on the power input USBIN.

In operation, the master-mode configured charging IC 202 shown in FIG. 3 operates as a buck converter to charge battery 22. Feedback control to the PWM driver circuit is provided by the circuitry comprising the charging IC 202, and likewise, the clock signal to the circuit is provided from within the charging IC. The configuration is a "standalone" configuration in the sense that there is only one charging IC.

Figure 4A:
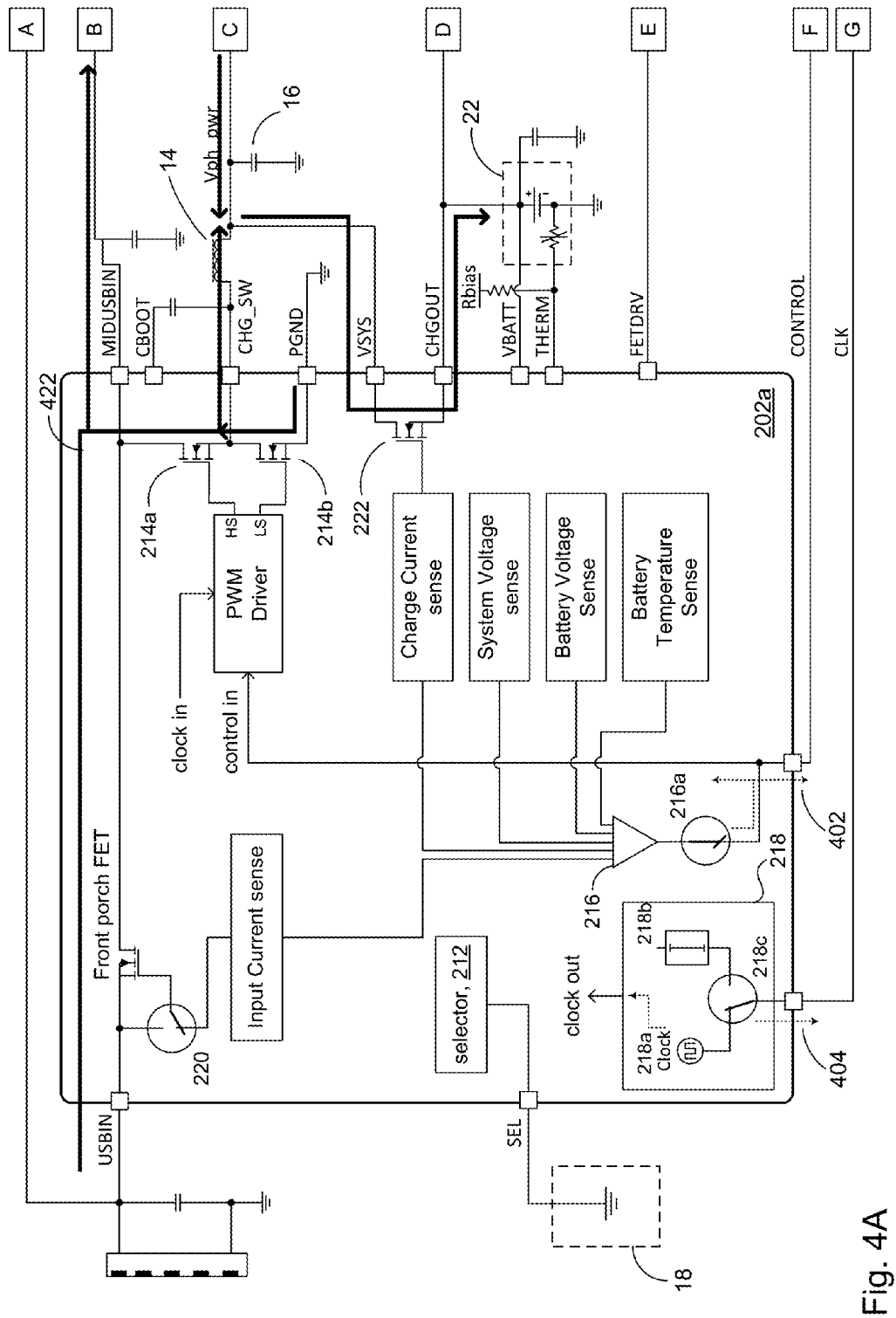
FIGS. 4A and 4B show a dual-phase configuration of charging circuits in accordance with the present disclosure.
Figure 4B:
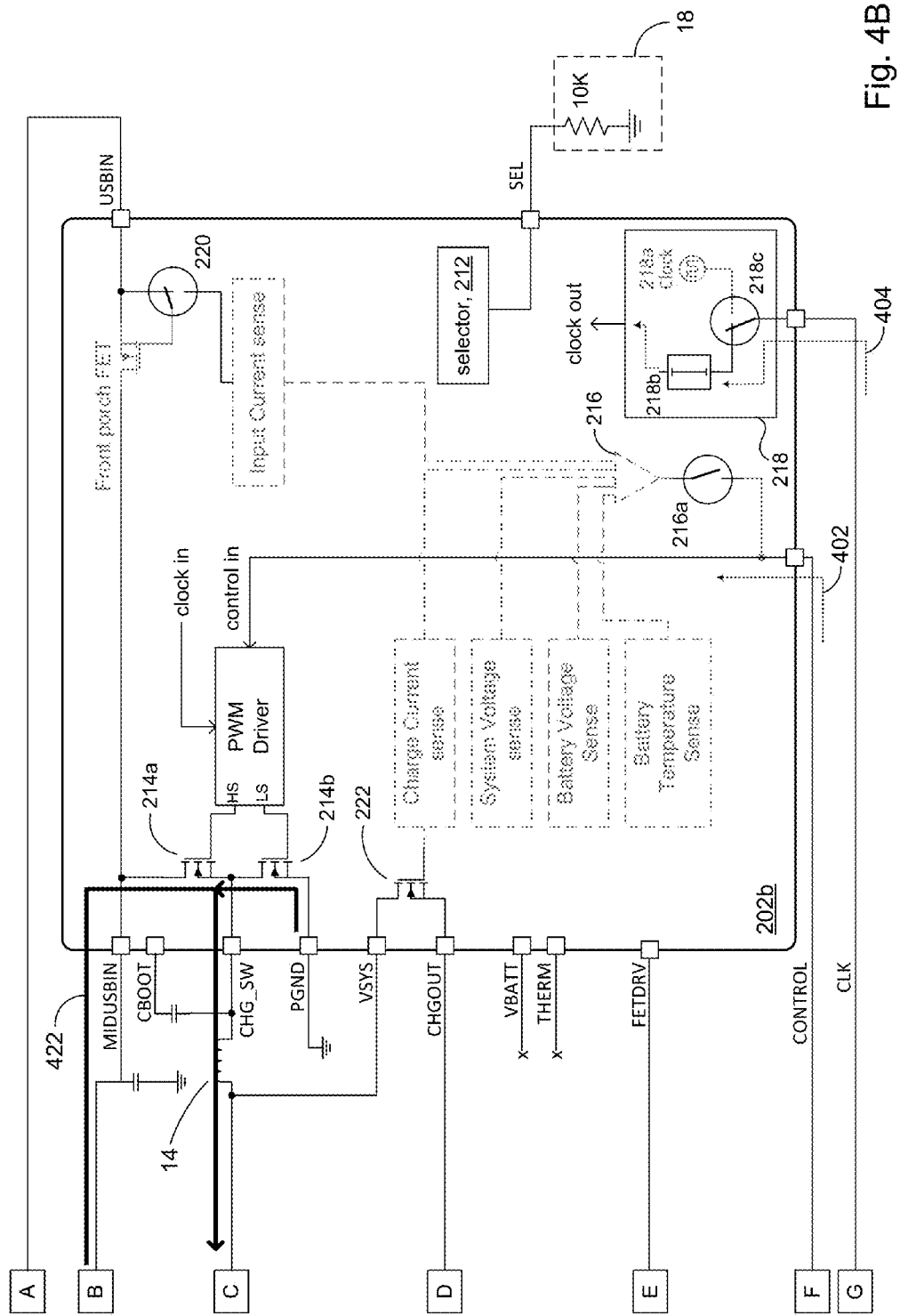

The discussion will now turn to a description of an example of a multi-phase configuration of the charging IC 202 in accordance with the present disclosure, and in particular a dual-phase configuration. In a dual-phase configuration, two charging ICs 202 are connected and operate together to charge a battery 22. One of the charging ICs 202 may be configured as a master device and the other as a slave device. FIGS. 4A and 4B show an example of charging ICs 202a and 202b configured to operate respectively as a master device and as a slave device. The charging ICs 202a, 202b are connected together at connections A, B, C, D, E, F, and G. The resulting current flow is illustrated in FIGS. 4A and 4B as flow 422.

The charging IC 202a shown in FIG. 4A is configured for master mode operation as described in FIG. 3. In accordance with the present disclosure, the control signal generated by the comparator 216 in charging IC 202a is provided as an externally generated control signal 402 (e.g., via the CONTROL terminal), in addition to serving as an internally generated control signal for the PWM driver circuit in the charging IC. Similarly, the clock signal generated by the clock generator 218 is provided as an externally generated clock signal 404 (e.g., via the CLK terminal), in addition to serving as an internally generated clock signal for the PWM driver circuit in the charging IC 202a.

Referring to FIG. 4B, the charging IC 202b is configured for slave mode operation. The charging IC 202b may be configured using the SEL input to operate in slave mode. In some embodiments, slave mode operation may be designated by a selection indicator 18 that comprises a resistive element. This convention for designating slave mode operation will be used for the remainder of the disclosure with the understanding that, in other embodiments, other conventions may be adopted to indicate salve mode operation. In a particular embodiment, for example, a 10K resistor may be used to indicate slave mode operation. It will be appreciated, of course, that another resistance value may be used. The selector 212 may be configured to respond to the detection of a 10 KΩ resistance at the SEL input by configuring the charging IC 202b for slave mode operation.

In slave mode operation, the selector 212 may operate the control selector 216a in a second configuration to receive the externally generated control signal 402 that is received on the CONTROL terminal of the charging IC 202b. The control selector 216a provides the externally generated control signal 402 to the control input of the PWM driver circuit. Operation of the control selector 216a in the second configuration disconnects or otherwise effectively disables the feedback network in charging IC 202b from the PWM driver circuit. This "disconnection" is emphasized in the figure by illustrating the elements of the feedback network in charging IC 202b using broken grayed out lines.

The selector 212 in charging IC 202b may also operate the clock selector 218c in a second configuration to receive the externally generated clock signal 404 on the CLK terminal The clock selector 218c provides the externally generated clock signal 404 to the delay element 218b. The clock signal that is provided to the PWM driver circuit comes from the delay element 218b, thus disconnecting or otherwise effectively disabling the clock generating circuit 218a in the charging IC 202b.

Switch 220 may be configured (e.g., by selector 212) to disable current sensing at the USBIN terminal of charging IC 202b. Power to the high- and low-side FETs 214a, 214b may be provided by the MIDUSBIN terminal via connection B. Similarly, charge current sensing in the slave-configured charging IC 202b may be disabled by disabling its battery FET 222.

As can be appreciated from the foregoing description, operation of the PWM driver circuit in the slave-mode charging IC 202b is controlled by the control signal and clock signal that is generated in the master-mode charging IC 202a and provided to the slave-mode charging IC 202b respectively as externally generated control and clock signals 402, 404. From the point of view of the slave-mode charging IC 202b, the control and clock signals generated in the master-mode charging IC 202a are deemed to be "externally generated."

The master-mode charging IC 202a may synchronize with the slave-mode charging IC 202b by asserting a signal on the FETDRV terminal. For example, when the master-mode charging IC 202a pulls the FETDRV terminal LO, the PWM driver circuit in the slave-mode charging IC 202b is disabled. When the master-mode charging IC 202a pull the FETDRV terminal HI, the PWM driver circuit in the slave-mode charging IC 202b begins switching. In some embodiments, the FETDRV terminal may be used by the master-mode charging IC 202a to initiate switching in the slave-mode charging IC 202b after the input current rises above a threshold level, in order to balance light-load and heavy-load efficiency. For example, switching losses at light load can outweigh the decreased conduction losses, which can be avoided by not enabling the slave-mode charging IC 202b right away. After enablement, the slave-mode charging IC 202b will operate in synchrony with the clock signal from the master-mode charging IC 202a. Control of the PWM driver circuit in the slave-mode charging IC 202b will be provided by the control signal from the master-mode charging IC 202a, thus allowing the master to set the charge current limit, input current limit, etc.

In accordance with the present disclosure, the delay element 218b may be configured (e.g., by selector 212) to provide a selectable phase shift that is suitable for dual-phase operation. For example, the delay element 218b may provide a 180° phase shift of the externally generated clock signal 404. Accordingly, the clock signal that is provided to the clock input of the PWM driver circuit in the slave-mode charging IC 202b is 180° out of phase relative to the clock signal in the master-mode charging IC 202a. Consequently, the charging cycle of the master-mode charging IC 202a will be 180° out of phase relative to the charging cycle of the slave-mode charging IC 202b. For example, when the high-side FET 214a is ON in the master device, the high-side FET in the slave device is OFF, and vice-versa.

Figure 5A:
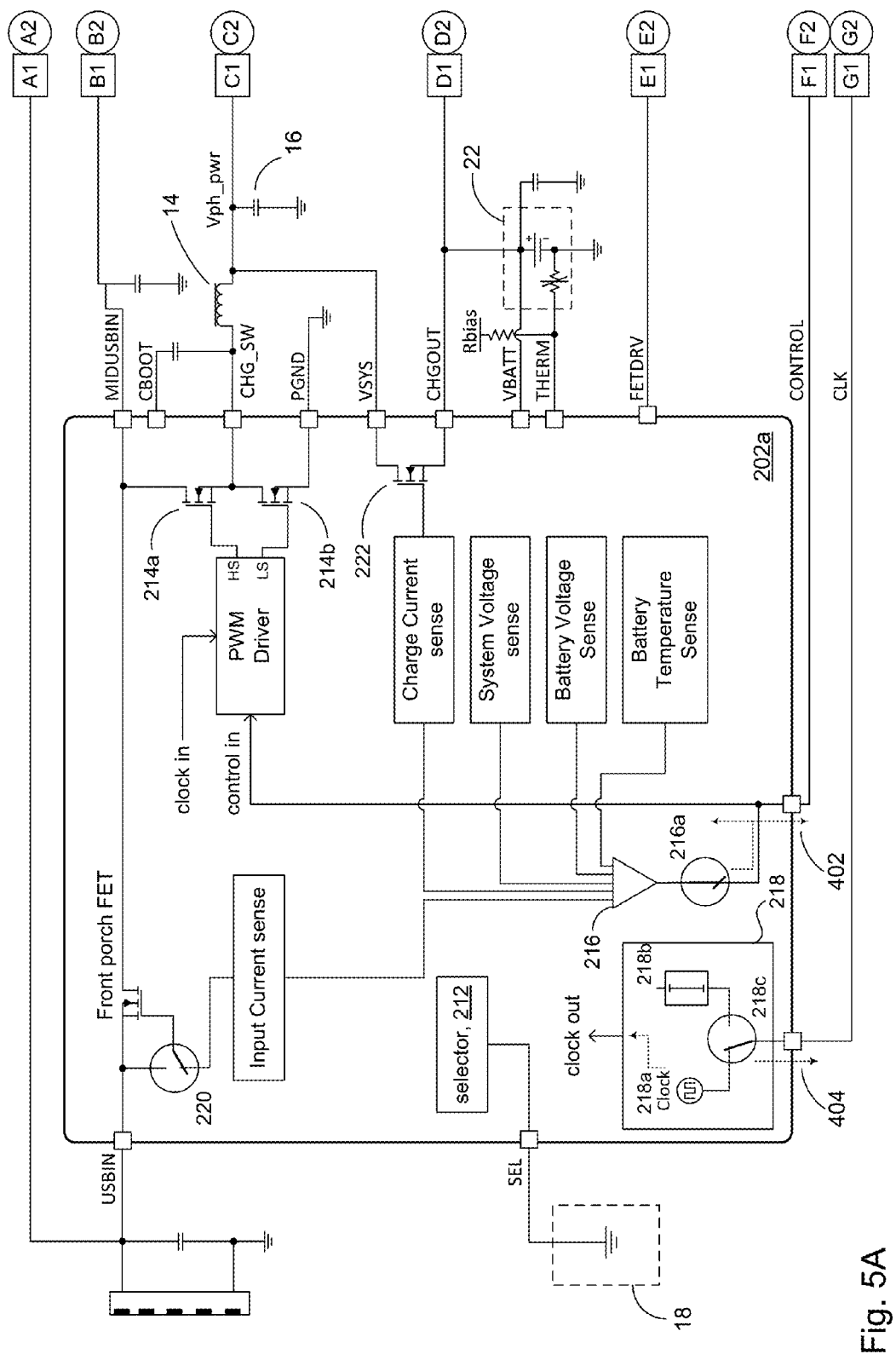
FIGS. 5A, 5B, and 5C show a 3-phase configuration of charging circuits in accordance with the present disclosure.
Figure 5B:
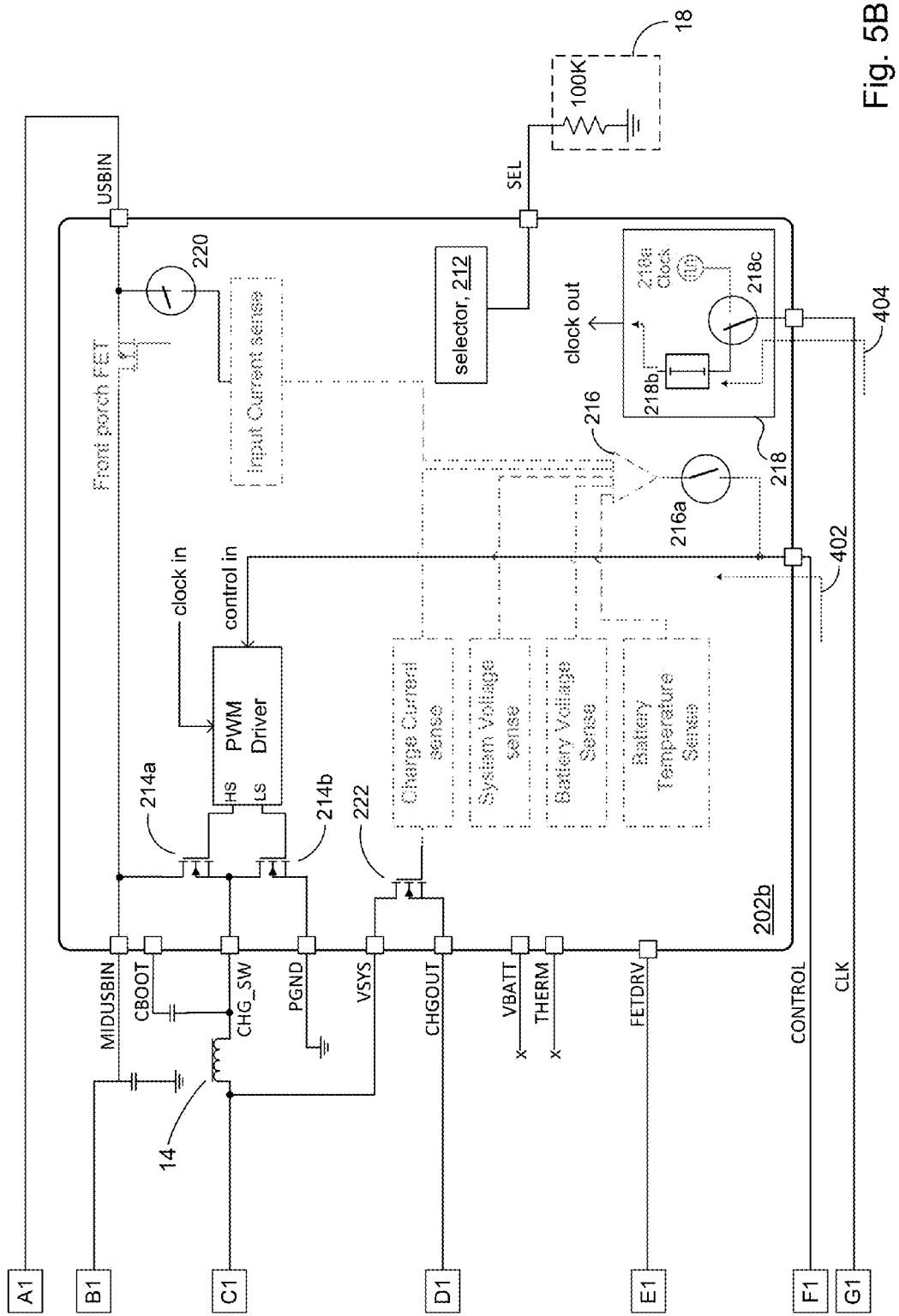
Figure 5C:
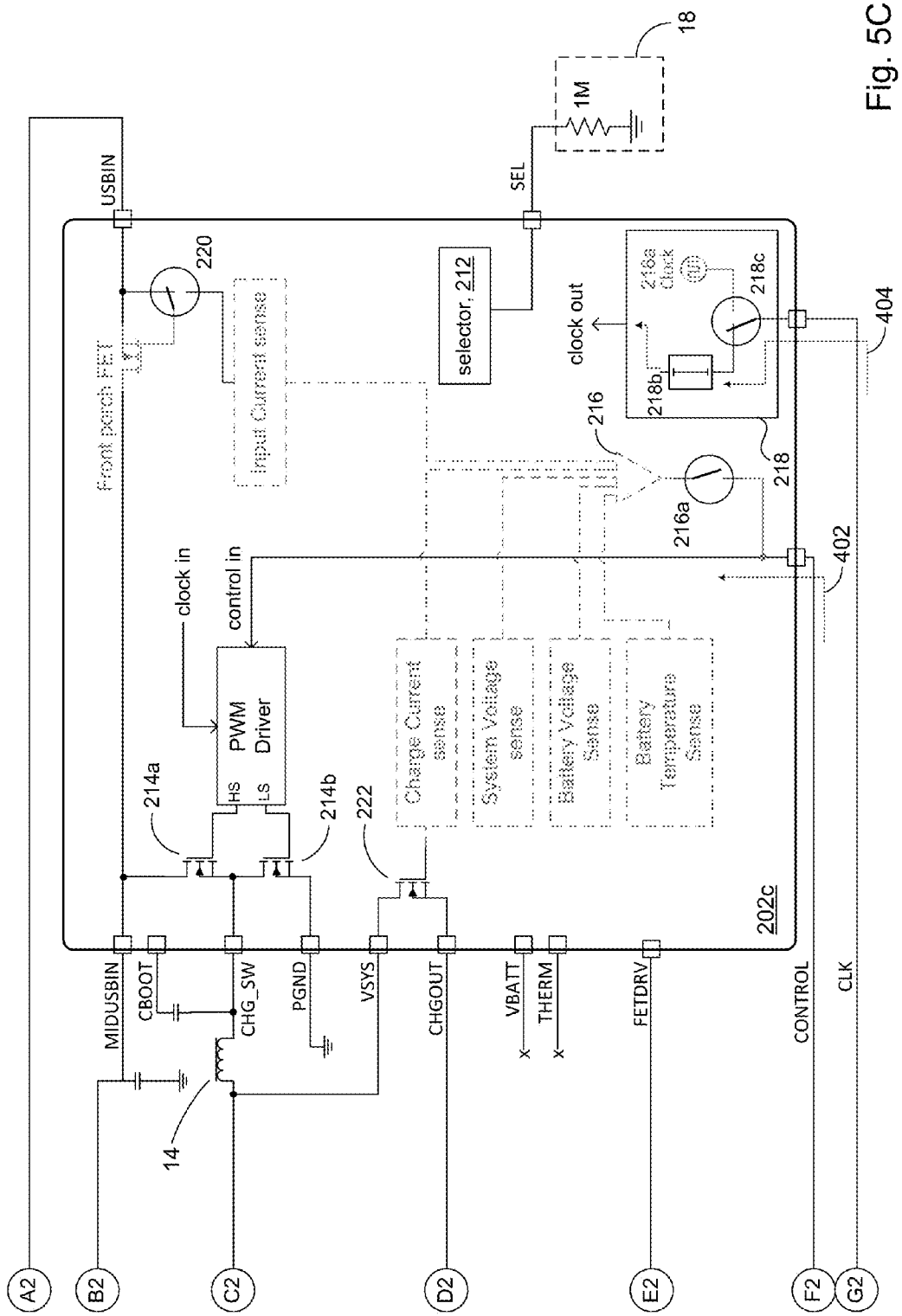

The discussion will now turn to a description of a 3-phase configuration of the charging IC 202 in accordance with the present disclosure. In a 3-phase configuration, three charging ICs 202 are connected and operate together to charge a battery 22. One of the charging ICs 202 may be configured as a master device and the other two as slave devices. FIGS. 5A-5C show an example charging ICs 202a, 202b, and 202c configured to operate respectively as a master device, a first slave device, and a second slave device. The charging ICs 202a, 202b, 202c are connected at connections A1, B1, C1, D1, E1, F1, and G1 and connections A2, B2, C2, D2, E2, F2, and G2.

The master device in FIG. 5A is configured as explained in connection with FIG. 4A. The first and second slave devices (FIGS. 5B and 5C) are configured as explained in connection with FIG. 4B. In 3-phase operation, the delay elements 218b in the first and second slave devices may be configured to provide 120° and 240° phase shifts, respectively, of the externally generated clock signal 404 as the clock input for the respective PWM driver circuits. For example, the selection indicator 18 in the first slave device of FIG. 5B may be a 100K resistor to indicate 120° phase shift, and similarly, the selection indicator 18 in the second slave device of FIG. 5C may be a 1M resistor to indicated 240° phase shift. It will be appreciated, of course, that other resistance values may be used. In operation, the charging cycle of the master device (FIG. 5A) will be 120° out of phase relative to the charging cycle of the first slave device (FIG. 5B) and 240° out of phase relative to the charging cycle of the second slave device (FIG. 5C).

It will be appreciated that, more generally, N-phase operation may be provided using N charging ICs (one master device and (N−1) slave devices) and connecting them in accordance with the examples shown in the figures. Each of the (N−1) slave devices receives from the master device the externally generated control signal 402 and the externally generated clock signal 404. In some embodiments, the $m^{th}$ slave device may be configured (e.g., using a suitable selection indicator 18) to provide an $m \times (360 \div N)°$ phase shift (e.g., using the delay element 218b) of the externally generated clock signal 404 as the clock input for its PWM driver circuit. In some embodiments, the quantity (m÷N) is an integral multiple of 360.

Figure 6:
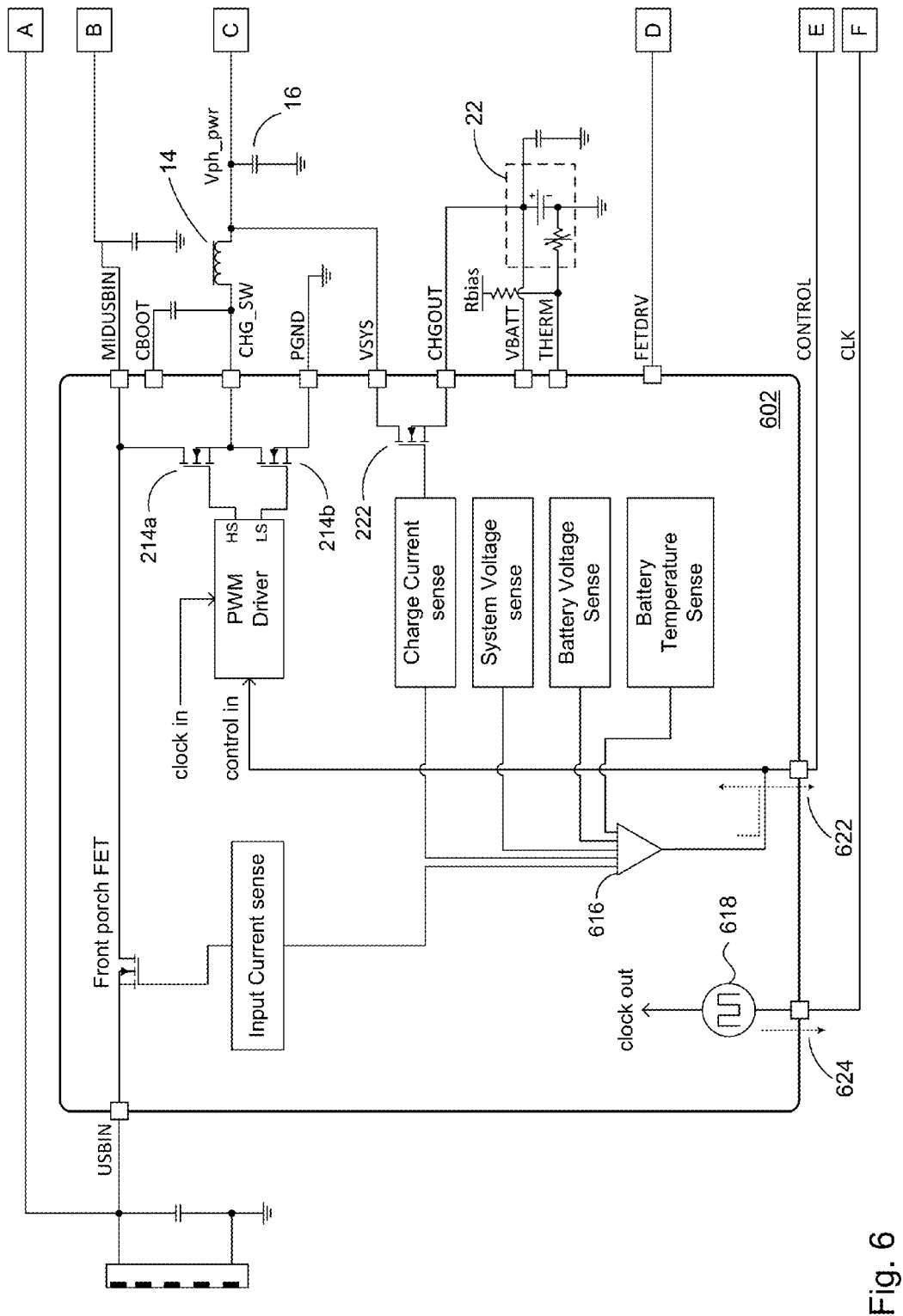
FIG. 6 illustrates an example of an implementation of a master-only charging circuit in accordance with the present disclosure.

The discussion will now turn to another embodiment of charging ICs in accordance with the present disclosure. In some embodiments, a charging IC may be implemented as a master-only device. In other words, the charging IC always operates in master mode and is not configurable to operate as a slave device. FIG. 6, for example, shows a charging IC 602 comprising, among other components, a feedback network comprising several sensor components (e.g., input current sense, charge current sense, etc.) that feed into a comparator 616. The comparator output generates an internally generated control signal that feeds into the control input of the PWM driver circuit and which serves as an externally generated control signal 622 that is output at the CONTROL terminal The charging IC 602 further comprises a clock 618 that generates a clock signal that generates an internally generated clock signal, which feeds into the clock in of the PWM driver circuit, and which serves as an externally generated clock signal 624 that is output at the CLK terminal This particular embodiment of charging IC always uses its internally generated control and clock signals and always outputs those signals as respective externally generated control and clock signals. As such, the charging IC 602 can omit selector 212, selectors 216a, 218b, and 220, and the delay element 218b in order to realize a smaller, lower cost device.

Figure 7:
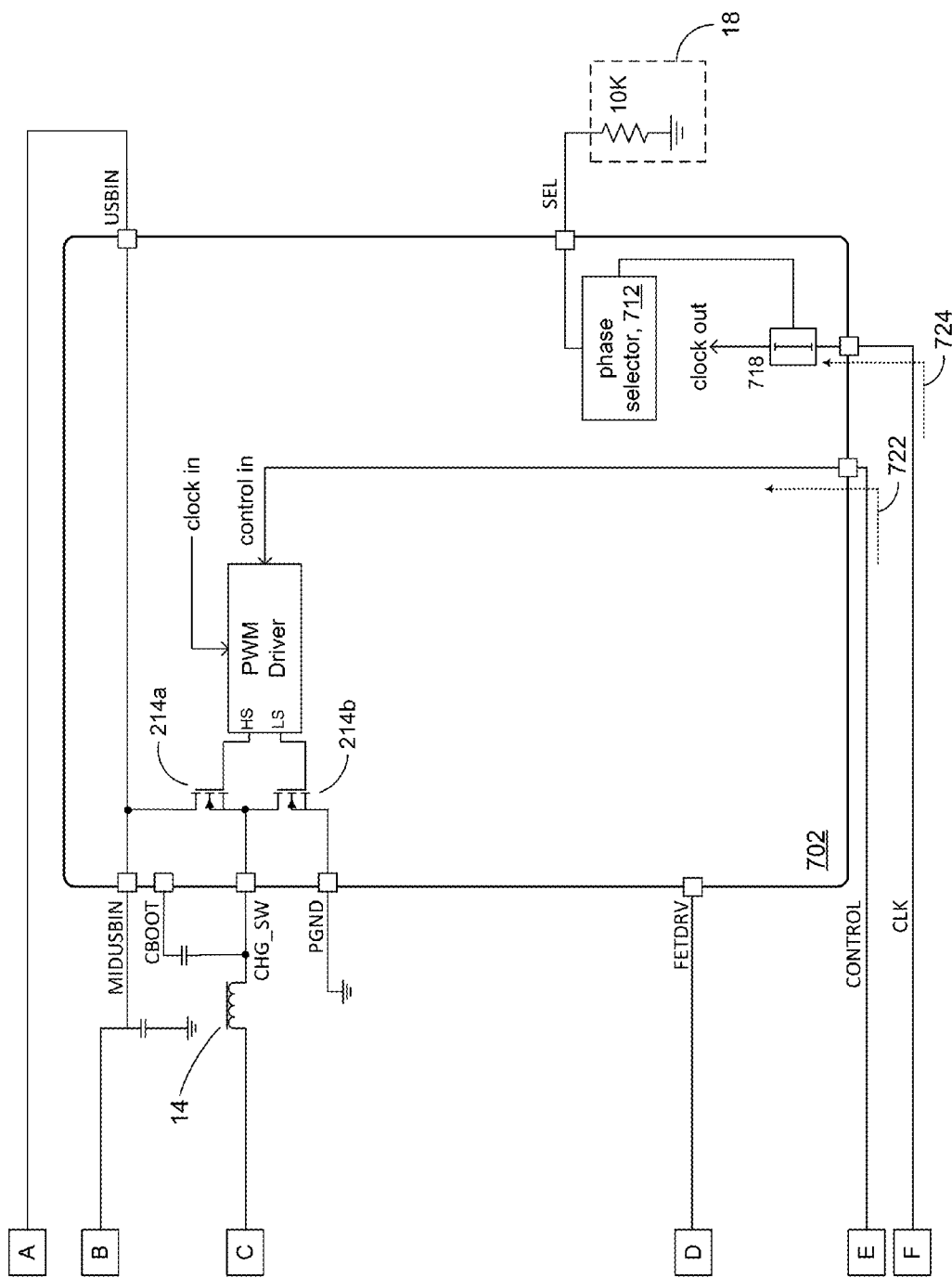
FIG. 7 illustrates an example of an implementation of a slave-only charging circuit in accordance with the present disclosure.

In some embodiments, a charging IC may be implemented as a slave-only device. FIG. 7, for example, shows a charging IC 702 comprising a PWM drive circuit having a control input that receives only an externally generated control signal 722 (e.g., from the CONTROL terminal). The PWM driver circuit, furthermore, has a clock input that receives only an externally generated clock signal 724 (e.g., from the CLK terminal). The selector 712 serves to configure a delay element 718 to provide phase shifting of the externally generated clock signal 724 according to the selection indicator 18. For example, the delay element 718 may be configured to provide an $m \times (360 \div (M+1))°$ phase shift of the externally generated clock signal depending on what is connected to the selector 712, where m identifies the charging IC 702 as being the $m^{th}$ slave device among a total of M slave devices.

The charging IC 702 is "slave-only" in the sense that it does not generate its control and clock signals internally, but rather obtains them from a source external to the charging IC. Since the control signal and clock signal are always externally generated, the slave-only charging IC 702 can omit the circuitry comprising the feedback network and the clock. Likewise, the slave-only charging IC 702 can omit the input FET and battery FET, since the device does not need to sense the input current. This can be advantageous in terms of a smaller device and/or a lower cost device, especially since the input and battery FETs are power FETs which can occupy significant areas on the die.

In some embodiments, the slave-only charging IC 702 may include additional circuitry to enhance performance. Though not illustrated, for example, a slave-only charging IC may include inductor current sense circuitry for peak current limiting. As another example, a slave-only charging IC may additionally include a thermal loop to ensure the junction temperature does not exceed a maximum operating limit.

Figure 8A:
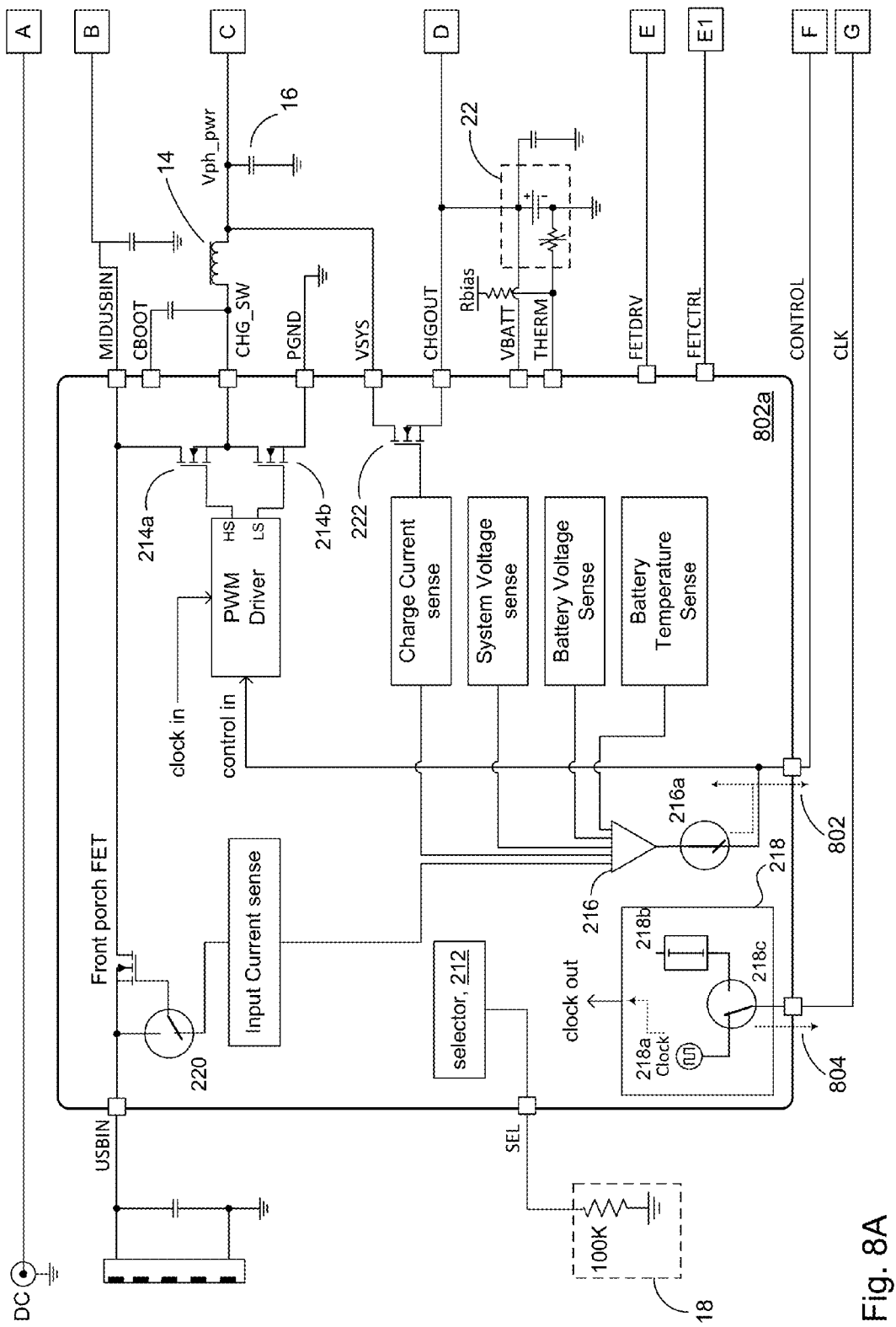
FIGS. 8A, 8B, and 8C illustrate an embodiment for a dual-input master-slave configuration.
Figure 8B:
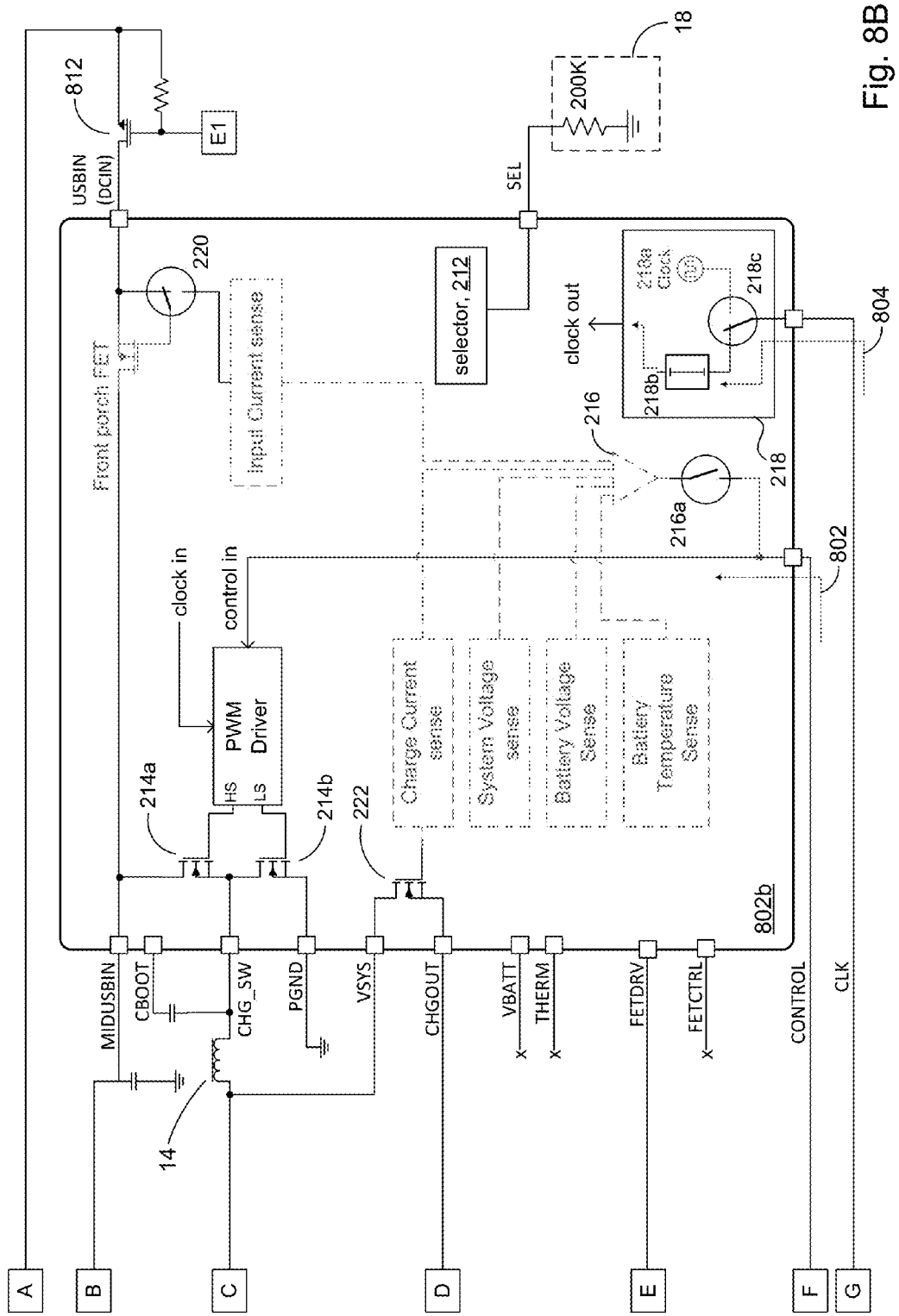
Figure 8C:
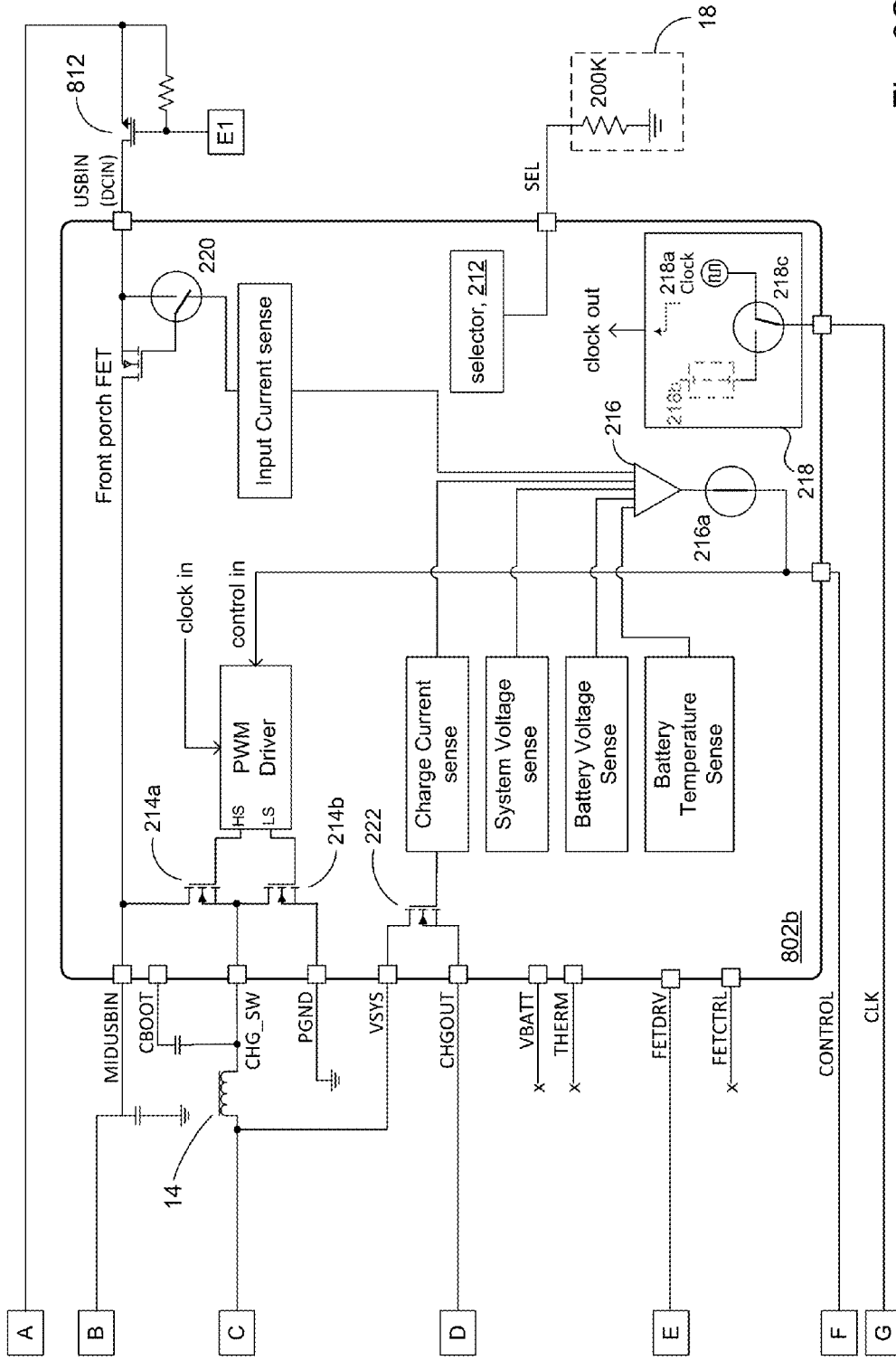

The discussion will now turn to a description of a dual-input two-phase master-slave configuration. Referring to FIGS. 8A, 8B, and 8C, a charging IC in accordance with the present disclosure may further include a FETCRTL terminal FIG. 8A shows the charging IC 802a configured as a dual-input master. In a particular embodiment, for example, the dual-input master configuration may be indicated with a selection indicator 18 that comprises a 100 KΩ resistor. FIG. 8B shows the charging IC 802b configured as a dual-input slave, operating in slave mode. FIG. 8C shows the charging IC 802b operating in master mode. In a particular embodiment, the dual-input slave configuration may be indicated using a selection indicator 18 that comprises a 200 KΩ resistor. The configuration is "dual-input" in the sense that there are two voltage inputs. A first voltage input (e.g., USBIN) may be connected to the dual-input master 802a and a second voltage input (e.g., DCIN) may be connected to the dual-input slave 802b via a DCIN FET 812, as illustrated in FIGS. 8A-8C for example.

In operation, when there is a voltage on USBIN terminal of the dual-input master 802a, the dual-input configured charging ICs 802a and 802b operate in a master/slave mode as explained above. For example, the dual-input master 802a generates a feedback control signal 802 that is used by the master and provided to the slave (FIG. 8B) via the CONTROL terminal. Likewise, the dual-input master 802a generates a clock signal 804 that is used by the master and provided to the slave via the CLK terminal The dual-input slave 802b shown in FIG. 8B uses the externally provided control signal 802 and clock signal 804 to control its PWM driver circuit. In addition, the dual-input master 802a asserts FETCTRL (e.g., goes high-z) to turn OFF the DCIN FET 812 that is connected to the dual-input slave 802b. This serves to electrically isolate the DCIN voltage source (if present) from the USBIN (DCIN) terminal of the dual-input slave 802b. The dual-input master 820a asserts FETDRV (e.g., pulls HIGH) to signal the dual-input slave 802b to operate in slave mode.

When there is no voltage on the USBIN terminal of the dual-input master 802a, the master does not perform battery charging. The dual-input master 802a will assert FETCTRL (e.g., goes LOW) to turn ON the DCIN FET 812 to allow current flow from the DCIN voltage source. The dual-input slave 802b operates in master mode to perform battery charging using the DCIN input provided on its USBIN terminal This master operating mode of the dual-input slave 802b is illustrated in FIG. 8C. Notably, the dual-input slave 802b does not receive an external control signal or clock signal on its CONTROL and CLK terminals, since the dual-input master 802a is not performing battery charging. Instead, the dual-input slave 802b generates its own control and clock signals and performs battery charging from DCIN in master mode.

Figure 9:
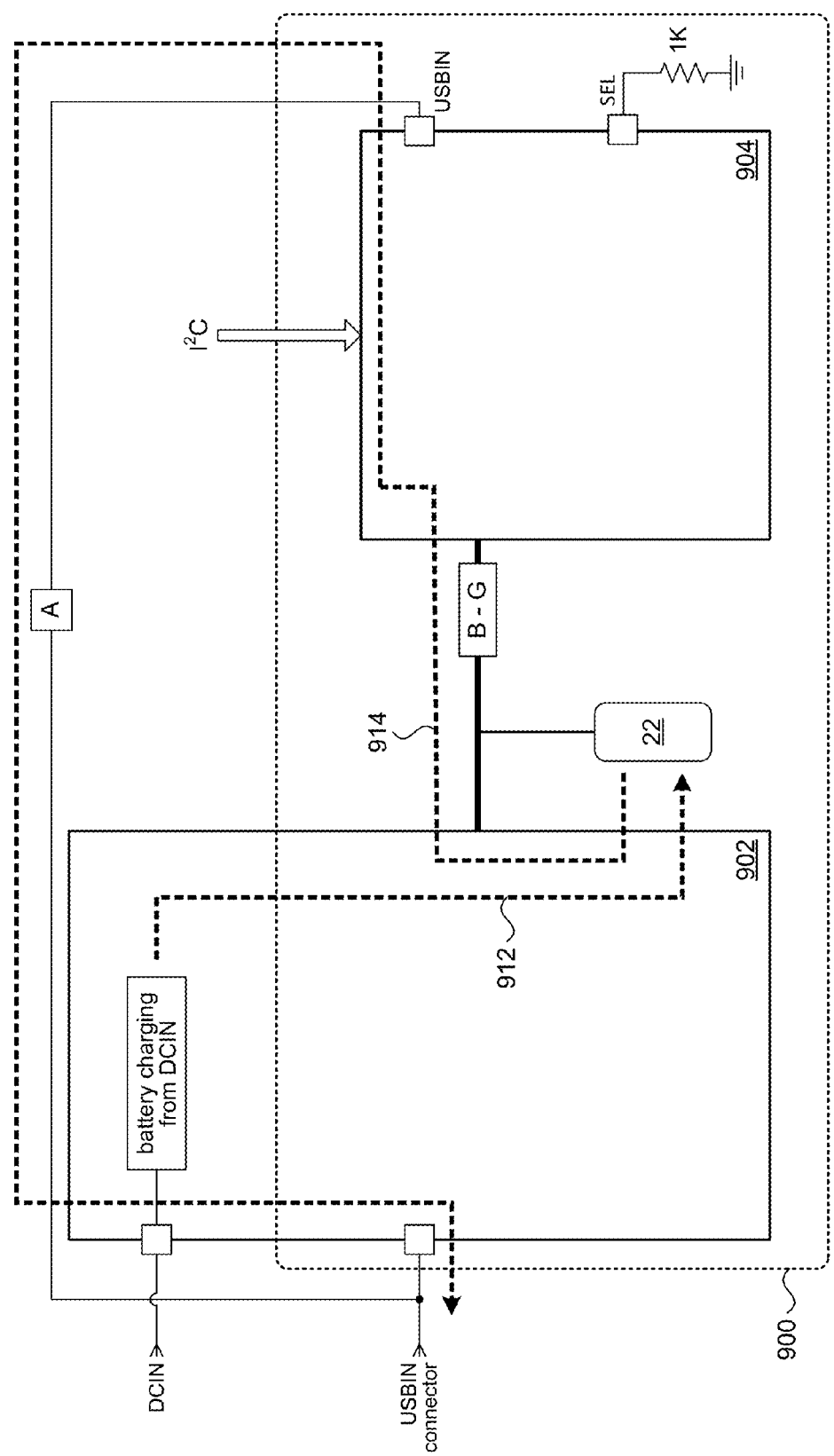
FIG. 9 illustrates an embodiment for a dual-input master.

The discussion will now turn to a description of a multi-phase master-slave configuration using, as the master device, a charging IC of the present disclosure configured for two voltage source inputs. FIG. 9 illustrates a dual-input charging IC 902 configured with a charging IC 904 configured for slave mode operation. The bounding box 900 is used to indicate that device 904 and a portion of device 902 are configured as illustrated in FIGS. 4A and 4B. In some embodiments, the device 902 may be configured to always operate in master mode. The device 904 may be configured with a selection indicator comprising a 1 kΩ resistor to indicate that the slave may operate in on-the-go (OTG) mode.

In operation, when charging from USBIN, the devices 902, 904 may operate in master/slave mode to provide multi-phase charging of the battery 22 as explained in the foregoing embodiments. However, when device 902 is charging from DCIN, the device 904 may be signaled to operate in OTG mode. For example, device 904 may include interface circuitry (not shown) to receive a command via the Inter-Integrated Circuit ($I^2C$) communication protocol. It will be appreciated, of course, that any other suitable signaling may be used.

In OTG mode, the device 904 provides power from the battery 22 directly to the USBIN terminal FIG. 9 illustrates the two different current flows 912, 914 in this "OTG" mode of operation. Flow 912 represents charging current from the dual-input charging IC 902 to charge battery 22. Flow 914 represents current from battery 22 to the USBIN terminal of device 902. It is noted that though control and clock signals from device 902 may be provided on its respective CONTROL and CLK terminals, the signals are not used by the device 904 in OTG mode.

FIG. 10 shows another configuration of battery charging devices 1002a, 1002b in accordance with the present disclosure. The battery charging devices 1002a, 1002b may be configured as buck converters. The inductor L and output capacitor C of each battery charging device are depicted as external components, but in some embodiments they can be internal. Each battery charging device (e.g., 1002a) may include control circuitry 1012 to control its battery charging operation. Additional details of control circuitry 1012 will be given below. Merely as an example, the battery charging device (e.g., 1002a) may be the SMB1357 switch-mode battery charging IC component, which is manufactured and sold by Qualcomm, Inc. As another example, the battery charging device may use the battery charging circuitry in the PMi8994 power management IC component, which is also manufactured and sold by Qualcomm, Inc.

In accordance with the present disclosure, the battery charging device (e.g., 1002a) may include a STAT (status) output or other equivalent indicator. The STAT output may output a signal that indicates whether the battery charging device is charging (e.g., logic HI) or not charging (e.g., logic LO). For example, if the battery charging device detects a fault condition (e.g., over-temperature event, charge timer timing out, etc.), the device may cease battery charging and assert the STAT output accordingly. In some embodiments, the STAT output may provide more information (digitally or in analog) than simply whether the battery charging device is charging or not; e.g., the STAT output may provide information indicative of a fault event.

The battery charging device may include an EN input or other equivalent enable control input that enables or disables operation of the battery charging device. For example, a logic HI asserted on the EN input may enable operation of the battery charging device, while a logic LO may serve to disable operation of the battery charging device. In some embodiments, a battery charging operation may be initiated by asserting the EN input. Subsequently de-asserting the EN input can be used to prematurely terminate or force quit a battery charging operation.

FIG. 10 illustrates a configuration of battery charging devices 1002a, 1002b in accordance with some embodiments of the present disclosure. The charging outputs CHG-OUT of battery charging devices 1002a, 1002b may be connectable to battery 22 via connection 24 (e.g., battery terminal). The STAT output of battery charging device 1002*a* may be connected to the EN input of battery charging device 1002*b*.

Figure 10A:
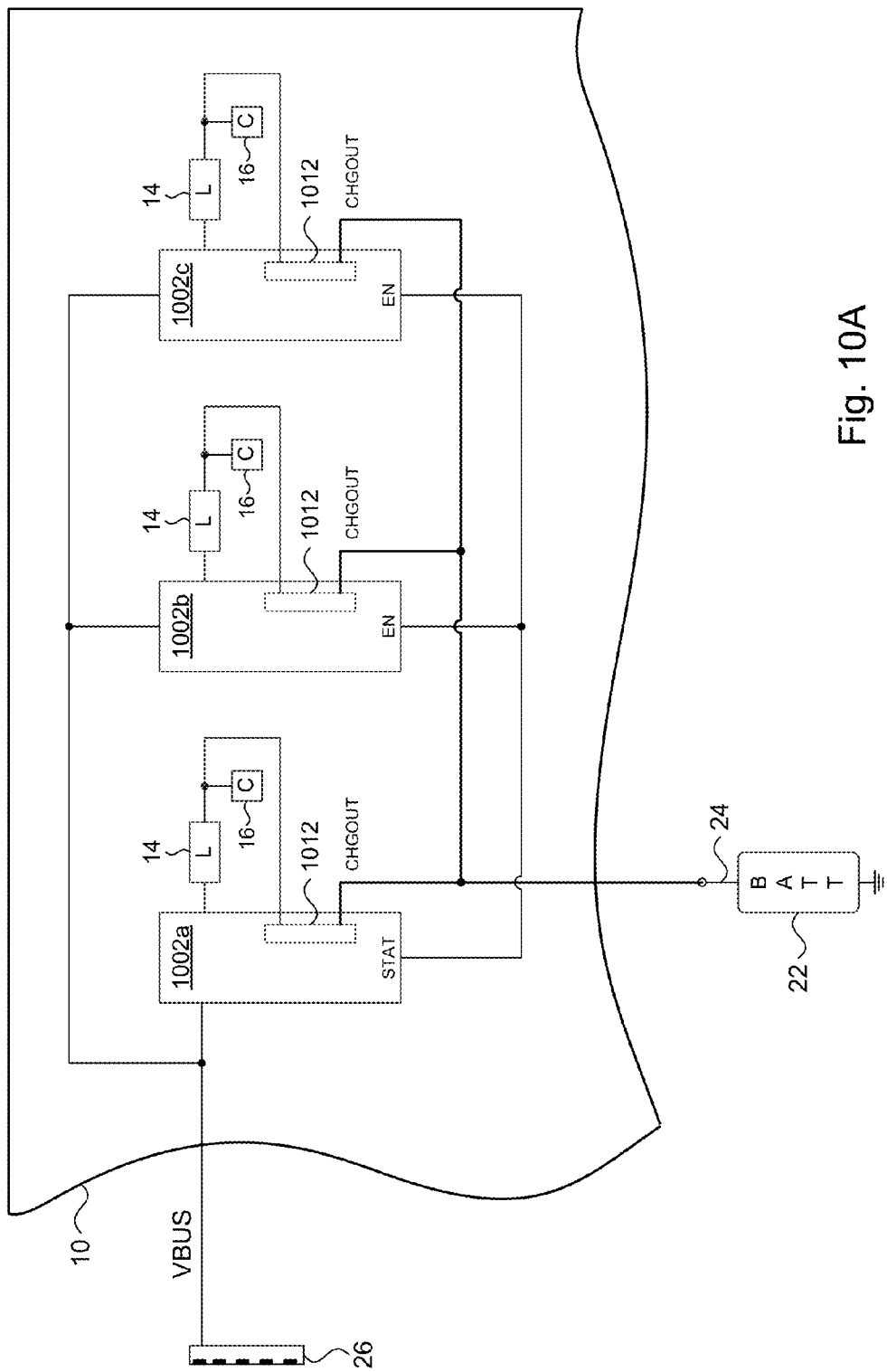

In some embodiments, more than two battery charging devices can be configured in accordance with the present disclosure. FIG. 10A, for example, illustrates a configuration comprising three battery charging devices 1002*a*, 1002*b*, 1002*c*. The CHGOUT of each battery charging device 1002*a*-1002*c* may be connected to battery 22 (e.g., via connection 24). The STAT output of battery charging device 1002*a* may be connected to the EN input of battery charging devices 1002*b* and 1002*c*. In FIGS. 10 and 10A, battery charging device 1002*a* may be referred to as the master or principle device and battery charging device 1002*b*, and battery charging device 1002*c* in FIG. 10A, may be referred to as slave or secondary devices, for the reason that the master device can disable the slave devices using its STAT output; for example, in response to the master device detecting a fault event.

In some embodiments, the same part (e.g., SMB1357) may be used to implement each of the battery charging devices 1002*a*-1002*c*. In other embodiments, the battery charging devices 1002*a*-1002*c* may be implemented using different parts; e.g., different parts from the same manufacturer, parts from different manufacturers, etc. Although the figure shows the battery charging devices 1002*a*-1002*c* to be buck converters, it will be appreciated that the battery charging devices can use any suitable switched mode voltage regulation design and in general can be configured with any suitable voltage regulation circuitry.

Figures 11, 11A:
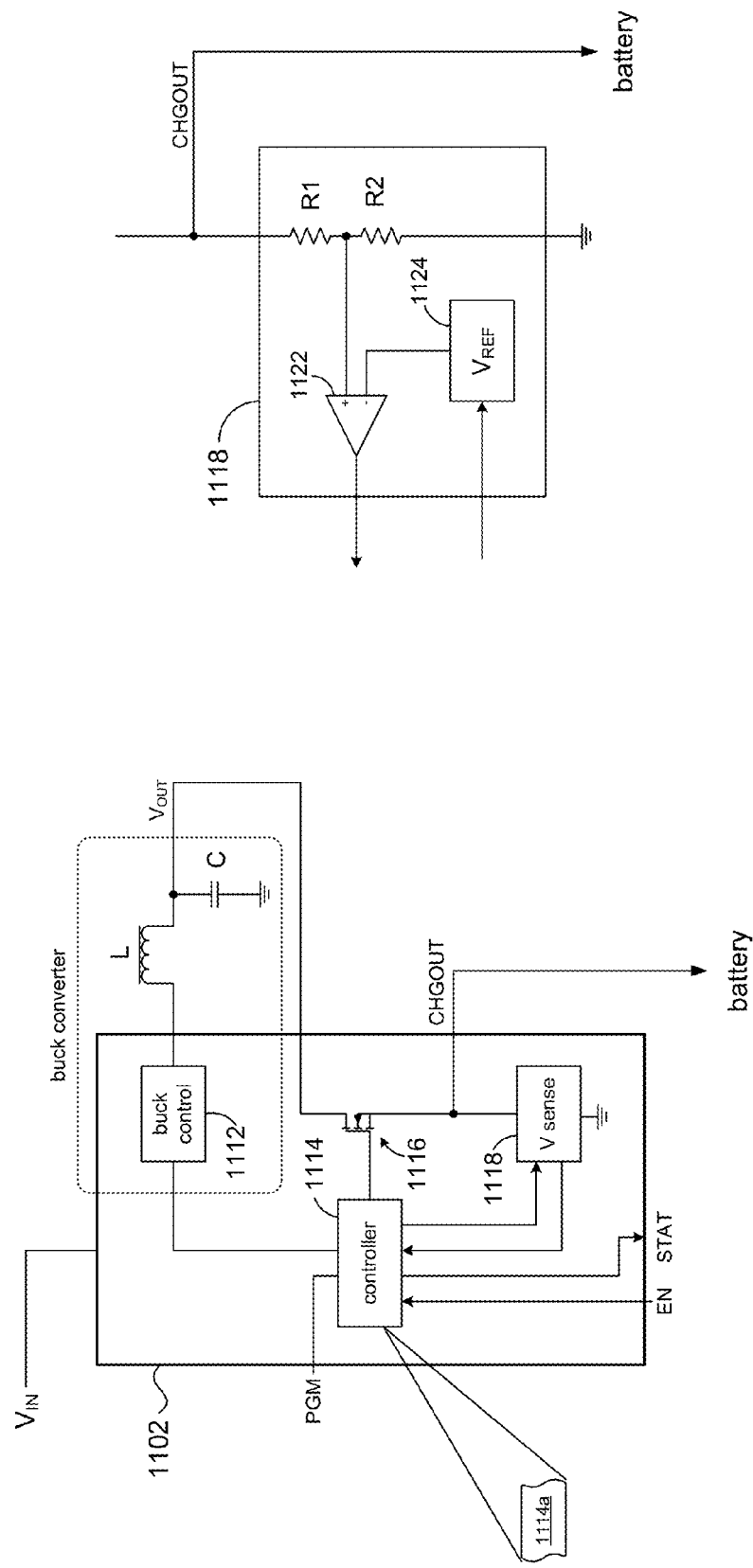
FIGS. 11 and 11A illustrate details of a charging circuit in accordance with the present disclosure.

FIG. 11 shows additional detail of a charging circuit 1102 in accordance with some embodiments of the present disclosure. In some embodiments, the charging circuit 1102 may include a buck convert comprising a buck control circuit 1112 operating in conjunction with inductor L and capacitor C. The inductor L and capacitor C components may be provided on-chip in the charging circuit 1102. Typically, however, these components are external to the charging device 1102 for practical reasons such as the physical sizes of the components, in order to provide better performing devices (e.g., semiconductor inductors typically do not perform as well as magnetic core inductors), to allow for flexibility in design, and so on. It will also be appreciated, that in other embodiments the charging circuit 1102 may employ a voltage regulator other than a buck converter design.

A controller 1114 may provide various control functions. For example, the controller 1114 may receive input from other circuitry (not shown) such as a temperature sensor, timers, current sensors, etc. The controller 1114 may use the input to detect a fault event that may require ceasing or otherwise disabling battery charging. The controller 1114 may assert a signal on the STAT output (e.g., logic HI), for example, so that an electronic device (e.g., 50, FIG. 1) that incorporates the charging circuit 1102 can signal the user of the fault event. Merely as illustrative examples, fault events may include excessive ambient temperature, a charging timer timing out, excessive current flow, battery disconnection during a charging operation, and so on.

The controller 1114 may include or otherwise have access to a data store (not shown) to store a battery voltage threshold value 1114*a*. The data store may be a data register or other suitable data storage element. The controller 1114 may include a programming input (PGM) to program or otherwise set the battery threshold voltage value 1114*a*.

The charging circuit 1102 may include a battery FET 1116 that is connected between the output $V_{OUT}$ of the buck converter and a charging output CHGOUT of the circuit, where the charging output can be connected to a battery to be charged. In some embodiments, the battery FET 1116 may an n-channel device, and in other embodiments may be a p-channel device. The illustrative embodiment of FIG. 11, for example, shows an NMOS type battery FET 1116. The drain terminal of the battery FET 1116 is connected to the output of the buck converter and the source terminal is connectable to a battery to be charged. The controller 1114 may include a control output that can be used to control the battery FET 1116, for example, by connecting the control output of the controller to the battery FET gate terminal. As will be explained below, the battery FET 1116 allows for control of a battery charging operation.

The charging circuit 1102 may include a voltage sense circuit 1118 (voltage sensor) to sense or otherwise detect the battery voltage level of a battery to be charged. Referring to FIG. 11A for a moment, the battery voltage sense circuit 1118, in some embodiments, may include a comparator 1122 to compare a battery voltage picked up by resistor divider network R1/R2 with a reference voltage 1124. The comparator output may be provided to the controller 1114 to control a battery charging operation based on the detected battery voltage level. The voltage reference 1124 may be programmable, and in some embodiments may be set by the controller 1114 according to the stored battery threshold voltage value 1114*a*.

In some embodiments, the battery charging operation may include a constant current charging state (constant current mode) followed by a constant voltage charging state (constant voltage mode). The controller 1114 may start the battery charging operation in the first charging state, constant current mode. When the battery voltage (e.g., as detected by voltage sense circuit 1118) exceeds the battery voltage threshold value, the controller 1114 may subsequently switch the battery charging operation to the second charging state, constant voltage mode.

In other embodiments, the battery charging operation may include only a single charging state; e.g., constant current charging. In still other embodiments, the battery charging operation may include multiple states of charging.

In some embodiments, the controller 1114 may orchestrate the battery charging operation by controlling the buck converter to maintain a constant current output during constant current mode charging. The controller 1114 can monitor the battery condition (e.g., battery voltage) to determine when to switch to constant voltage charging, at which time the controller can control the buck converter to maintain a constant voltage output for constant voltage mode charging.

The charging circuit 1102 may include a STAT output. In some embodiments, the controller 1114 may monitor other conditions in the charging circuit 1102 for the occurrence of fault events. The controller 1114 may assert a suitable signal (digital or analog) on the STAT output in response to determining that a fault event has occurred. External circuitry in an electronic device that incorporates the charging circuit 1102 may process the signal accordingly; e.g., warn a user, trigger an alarm, etc. In other embodiments, circuitry other than or in addition to the controller 1114 may detect fault events and assert the STAT output.

The charging circuit 1102 may include an EN input. As explained above, the EN input may be used to tell the charging circuit 1102 whether or not a battery charging operation can be performed. Circuitry external to the charging circuit 1102 can assert a signal (digital or analog) on the EN input when battery charging is not desired. In some embodiments, the controller 1114 may receive the signal and disable the battery charging operation in response. In other embodiments, circuitry other than the controller 1114 may be employed.

Figure 12:
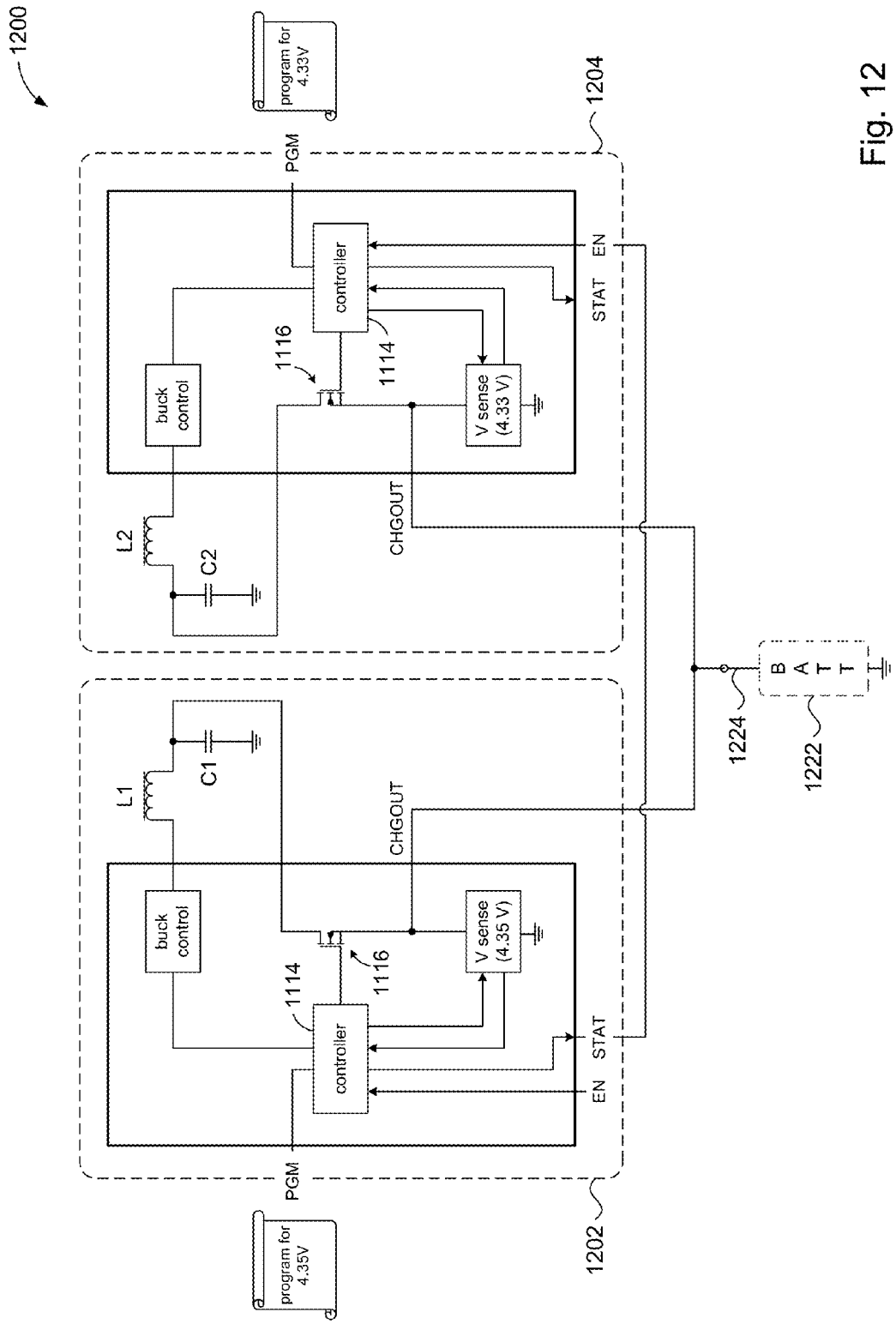
FIG. 12 shows a battery charging circuit in accordance with the present disclosure.

FIG. 12 shows a battery charging circuit 1200 in accordance with the present disclosure, for example, using circuitry such as shown in FIG. 11. The battery charging circuit 1200 may comprise charging circuits 1202 and 1204. In some implementations, the same device may used for the charging circuits 1202 and 1204. In other implementations, different devices may be used for charging circuits 1202 and 1204; for example, the devices need not be the same part, and may even be parts from different manufacturers. For explanation purposes, however, FIG. 12 shows charging circuit 1202 to be the same as charging circuit 1204.

The battery charging circuit 1200 may include a battery terminal 1224 that is connectable to a battery to be charged 1222. The charging outputs CHGOUT of charging circuit 1202 and charging circuit 1204 may be connected together at battery terminal 1224. When the charging circuits 1202, 1204 are performing a battery charging operation, power from the buck converter of each charging circuit can be provided to the battery 1222.

The STAT out of charging circuit 1202 may be connected to the EN input of charging circuit 1204. The charging circuit 1202 may be deemed the master or primary device, because charging circuit 1202 can disable charging circuit 1204 (slave or secondary device) when charging circuit 1202 detects a fault event and asserts a suitable signal on STAT out.

Further in accordance with the present disclosure, the master device (e.g., charging circuit 1202) may be programmed with a higher battery threshold voltage value than that of the slave device (e.g., charging circuit 1204). In the particular illustrative embodiment shown in FIG. 12, for example, the master device is programmed with a battery threshold voltage value of 4.35 V and the slave device is programmed with a battery threshold voltage value of 4.33 V.

Figure 13A:
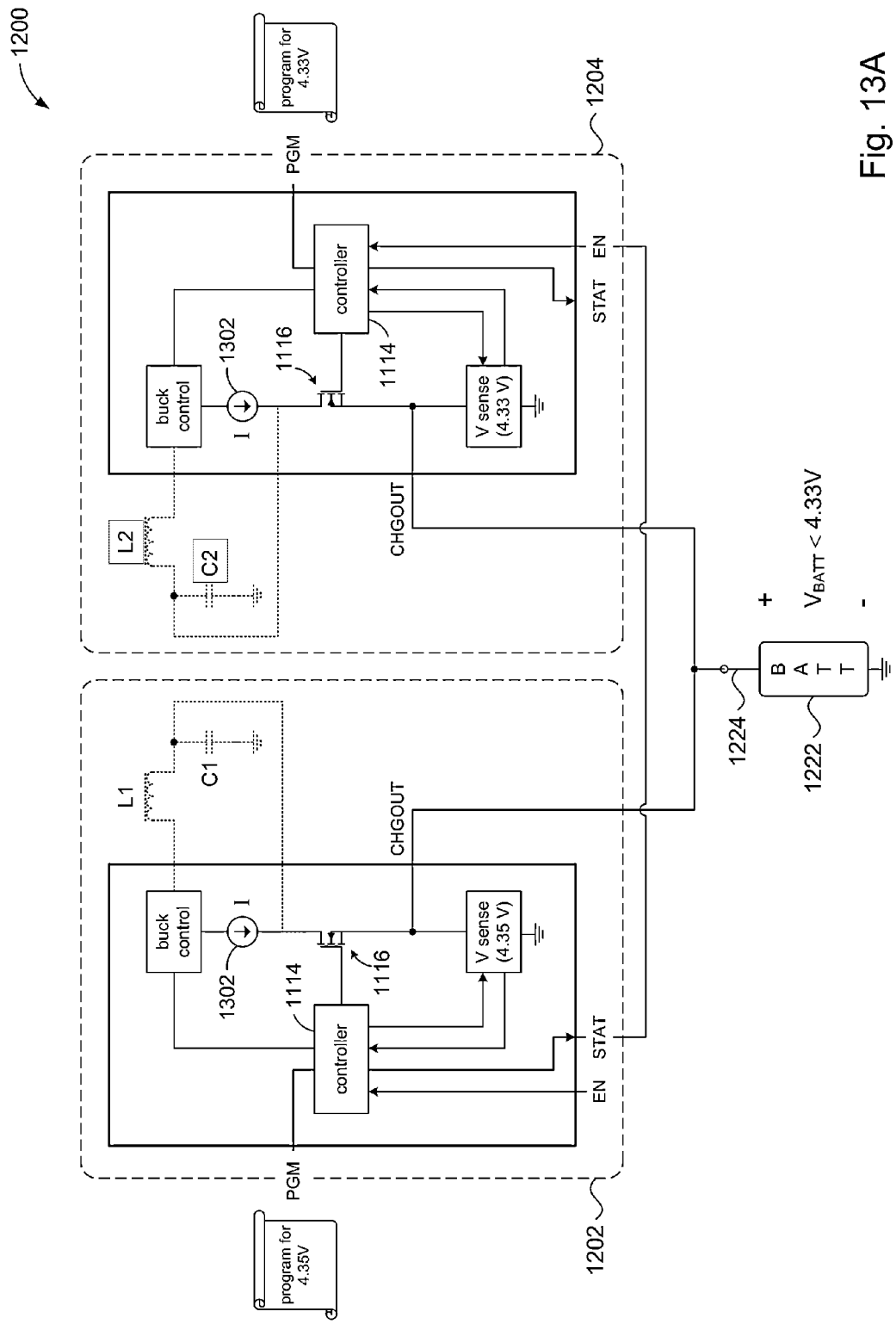
FIGS. 13A-13D illustrate a battery charging operation in accordance with the present disclosure.

In operation, when the battery charging circuit 1200 begins a battery charging operation (e.g., by asserting the EN inputs of both charging circuits 1202, 1204) the charging circuit can begin in a constant current charging state. Referring to FIG. 13A, the buck converter may operate in a constant current mode, operating effectively as a constant current source 1302 providing a current I, as depicted in the figure to battery 1222. During this state of charging, current I from both charging circuits 1202, 1204 flows into battery 1222, thereby charging the battery. In some embodiments, such as illustrated in FIG. 12, the current flow from each charging circuit 1202, 1204 may be the same. In other embodiments, the current flows may be different.

As current from charging circuits 1202, 1204 flow into battery 1222, the battery begins to charge and the battery voltage $V_{BATT}$ begins to rise. When the battery voltage passes or crosses the battery threshold value, the controller 1114 may subsequently switch the next state of the battery charging operation. If there is only one charging state (e.g., constant current mode), then the next state is a termination state. In some embodiments, where the battery charging operation includes a constant current charging state and a constant voltage charging state, the controller 1114 can switch the battery charging operation from constant current charging to constant voltage charging.

Figure 13B:
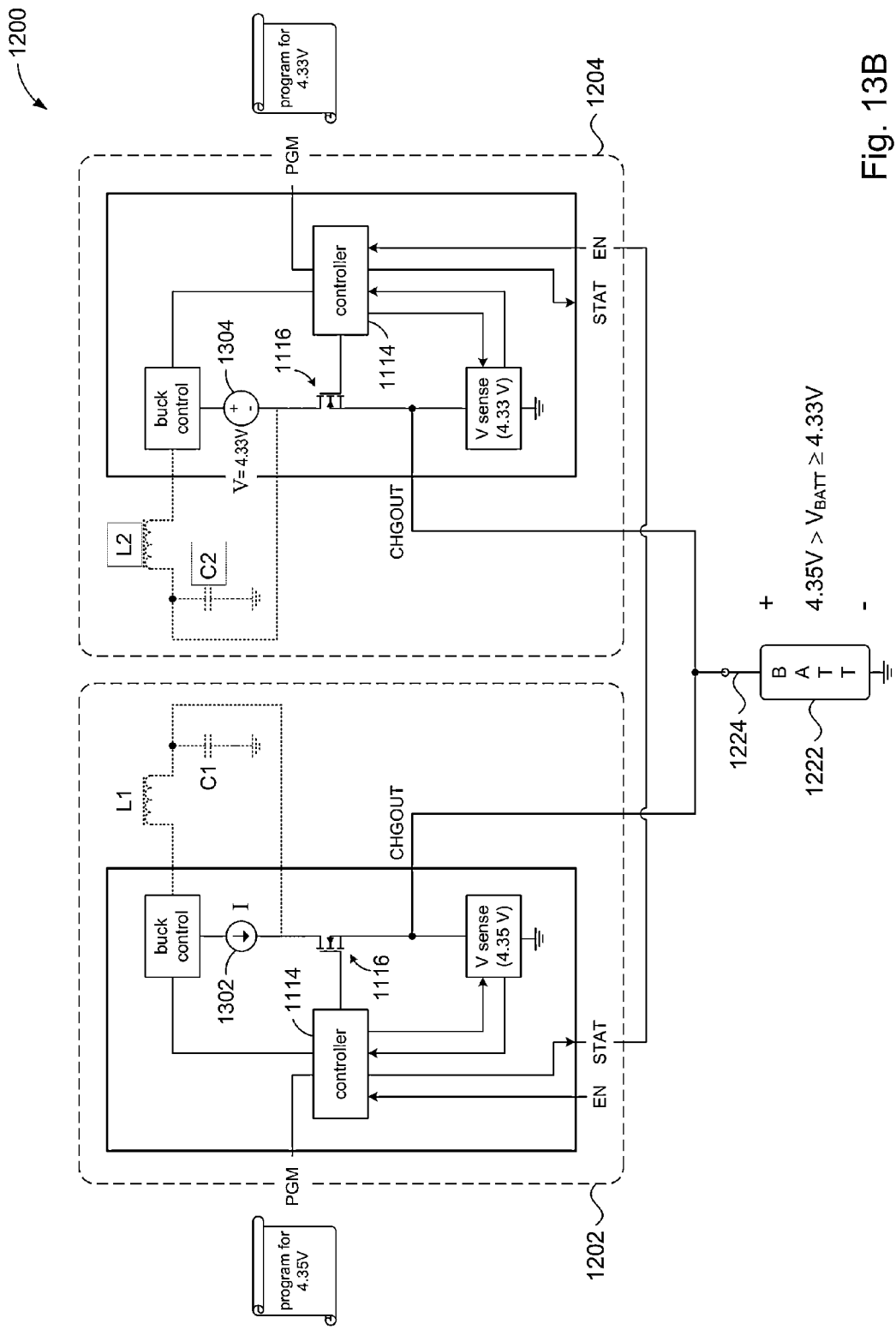

FIG. 13B illustrates an example of an embodiment in which the battery charging operation includes a constant current state and a constant voltage state. In the example shown, the master device (charging circuit 1202) is configured to have a battery threshold voltage value of 4.35V, and the slave device (charging circuit 1204) is configured with a battery threshold voltage value of 4.33V. Accordingly, as the battery voltage $V_{BATT}$ increases from less than 4.33V (FIG. 13A) to 4.33V and crosses 4.33V, the controller 1114 in the slave device can detect that crossing and in response can switch from constant current charging to constant voltage charging. The controller 1114 in the slave device can control operation of the buck converter to act as a constant voltage source 1304, as depicted in the figure, to provide a constant voltage output of 4.33V as determined, for example, based on the battery threshold voltage value that is set in the slave device.

Figure 13C:
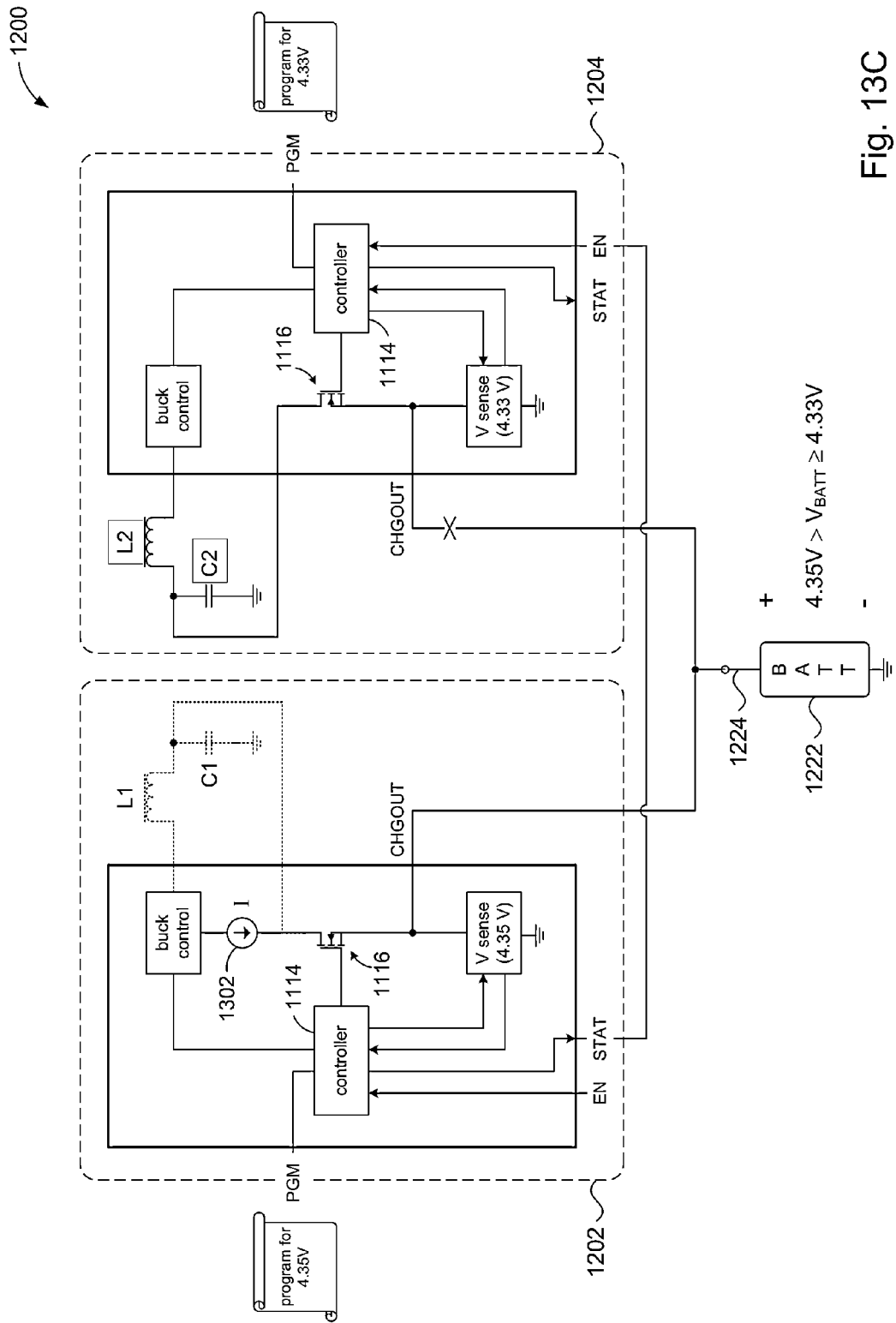

At the same time, the buck converter in the master device continues to operate as a constant current source. As current from the master device continues to flow into the battery 1222, the battery voltage $V_{BATT}$ continues to rise to a value greater than 4.33V. The resulting voltage difference across the source and drain of battery FET 1116 will create an increasing pinch-off effect that will eventually turn OFF the battery FET. When the controller 1114 in the slave device detects this condition, it can terminate the battery charging operation in the slave device (e.g., disable the buck controller 1112). This condition is shown in FIG. 13C, where only the master device is performing the battery charging operation and the slave device is schematically depicted as being turned off.

Figure 13D:
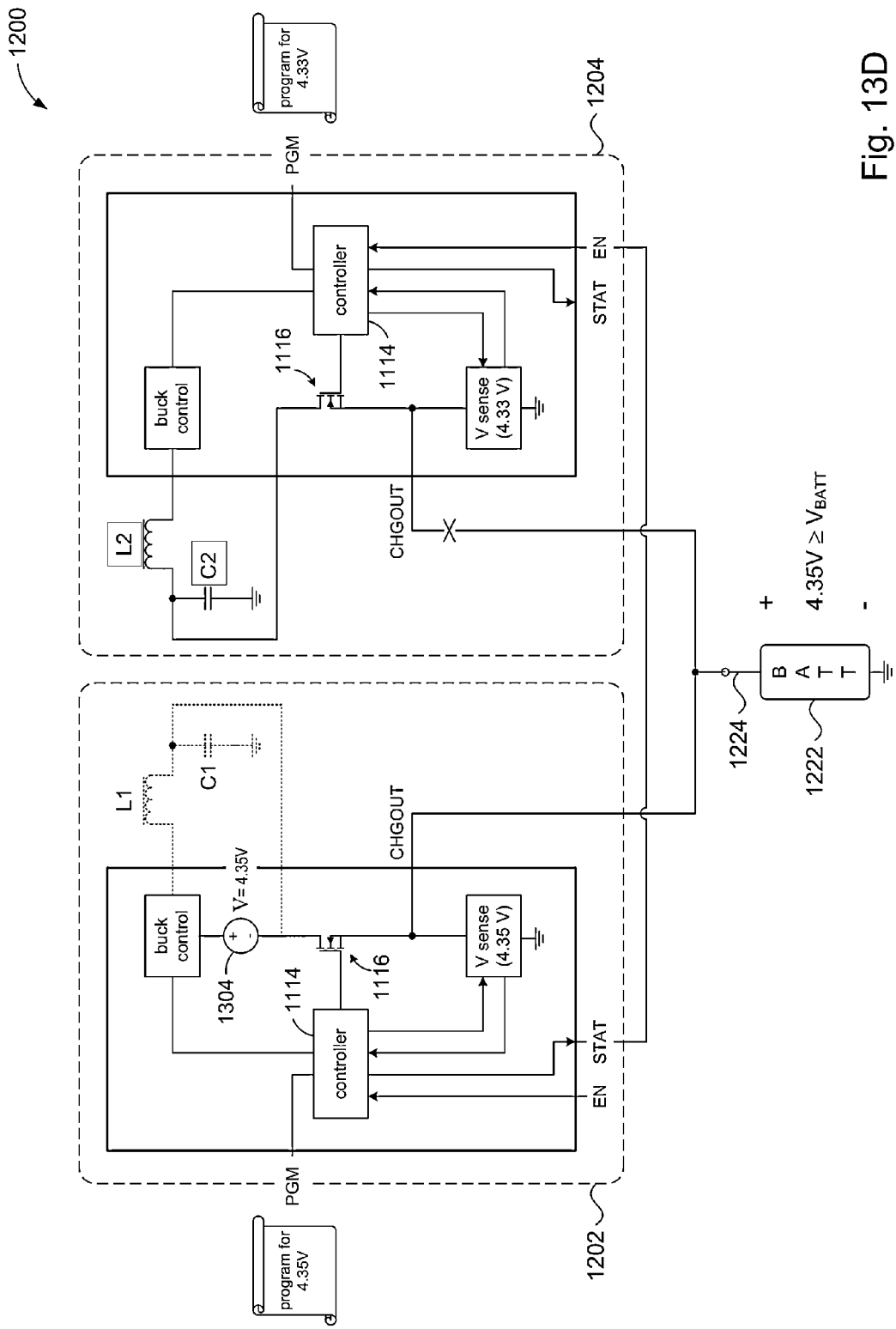

The master device will continue charging in constant current mode until the battery voltage $V_{BATT}$ passes the battery threshold voltage value. Referring to FIG. 13D, in response to $V_{BATT}$ passing the battery threshold voltage value (e.g., 4.35V), the controller 1114 in the master device can switch from constant current charging to constant voltage charging. The controller 1114 can control operation of the buck converter in the master device to act as a constant voltage source 1304, as depicted in FIG. 13D, to provide a constant voltage output of 4.35V as determined, for example, based on the battery threshold voltage value. The controller 1114 may then terminate the battery charging operation after the batter voltage $V_{BATT}$ exceeds a final value.

In some embodiments, the battery charging circuit 1200 can comprise two or more slave devices. Each additional slave device can be configured with a battery threshold voltage value that is smaller than the other slave devices. Merely as an example, if a battery charging circuit comprises two slave devices, the battery threshold voltage values for the slave devices may be 4.33 V and 4.31 V, and for the master circuit may be 4.35 V.

Accordingly, in such an embodiment, the 4.31V slave circuit may switch over from constant current mode to constant voltage mode first, after the battery voltage reaches and exceeds 4.31 V. As the battery continues to charge, it's voltage will continue to rise. Pinch-off in the battery FET of the 4.31V slave circuit may cause that charging circuit to turn off, leaving the master circuit and the 4.33V slave circuit charging the battery.

The battery will continue to charge and it's voltage will reach and exceed 4.33 V. This may cause the 4.33V slave circuit to switch over from constant current mode to constant voltage mode. As the battery continues to charge, it's voltage will continue to rise. Pinch-off in the battery FET of the 4.33V slave circuit may cause that charging circuit to turn off, leaving only the master circuit charging the battery. As explained above, eventually the master circuit will go into constant voltage mode and eventually turn off.

ADVANTAGES AND TECHNICAL EFFECT

Each of the charging circuits (e.g., 1202) is capable of charging a battery. An advantageous aspect of the present disclosure is that the battery charging circuit can provide fast charging during constant current mode because two or more charging circuits (e.g., 1202, 1204) can be combined to contribute charging current to the battery. Since the slave device(s) (e.g., 1204) switches out of constant current mode and into constant voltage mode before the master device (e.g., 1202), the slave device turns off as explained above before the master device goes into constant voltage mode charging. This avoids the potential adverse effects of having two voltage sources connected to each other. The slave device turning off can ensure that there is only one constant voltage source in the circuit.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A battery charging circuit comprising:
   first and second charging circuits, each charging circuit having a charging output connectable to a battery and comprising: a voltage regulator to provide power to the charging output; a battery voltage threshold value; and a controller operable to change a charging state of a battery charging operation based on comparing a detected battery voltage with the battery voltage threshold value,
   the charging output of the first charging circuit connected with the charging output of the second charging circuit,
      wherein the first charging circuit and the second charging circuit are configured to collectively charge the battery,
   the battery voltage threshold value of the first charging circuit set to a higher value than the battery voltage threshold value of the second charging circuit, wherein based on comparing the threshold values with the detected battery voltage, the battery charging operation in the second charging circuit is terminated prior to the battery charging operation in the first charging circuit.

2. The circuit of claim 1 wherein the first charging circuit further comprises a status output, the controller in the first charging circuit operable to assert a signal on the status output in response to the first charging circuit detecting a fault event,
   the second charging circuit further having an enable control input connected to the status output, the controller in the second charging circuit operable to disable a charging operation in the second charging circuit in response to a signal asserted on the enable control input,
   whereby a fault event detected by the first charging circuit can disable the charging operation in the second charging circuit.

3. The circuit of claim 1 wherein the voltage regulator in each of the first and second charging circuits comprises a buck converter.

4. The circuit of claim 1 wherein the voltage regulator of at least the second charging circuit comprises a field effect transistor (FET) device connected to an output of the voltage regulator, the charging output being an output of the FET device.

5. The circuit of claim 1 wherein, in the first and second charging circuits, the battery charging operation includes a constant current charging state and a constant voltage charging state.

6. The circuit of claim 1 wherein, in the second charging circuit, the controller is operable to perform a first change of the charging state of the battery charging operation from a constant current charging state to a constant voltage charging state in response to the detected battery voltage exceeding the battery voltage threshold value of the second charging circuit, whiles keeping the charging state of the battery charging operation of the first charging circuit at the constant current charging state,
   wherein after the first change, in the first charging circuit, the controller is operable to perform a second change of the charging state of the battery charging operation from the constant current charging state to the constant voltage charging state in response to the detected battery voltage exceeding the battery voltage threshold value of the first charging circuit.

7. The circuit of claim 1 wherein the first and second charging circuits, each, further comprises a voltage sensor operable to sense a voltage level of a battery connected to the battery charging circuit.

8. A circuit comprising:
   a first charging circuit comprising a charging output;
   a second charging circuit comprising a charging output; and
   a battery terminal connectable to a battery to be charged, the charging output of the first charging circuit connected to the battery terminal, the charging output of the second charging circuit connected to the battery terminal, wherein the first charging circuit and the second charging circuit are configured to collectively charge the battery,
   the second charging circuit is configured to perform a first change of a charging state of a battery charging operation from a first state to a second state in response to a detected battery voltage level exceeding a second threshold voltage level, while keeping a charging state of a battery charging operation of the first charging circuit at the first state,
   wherein after the first change, the first charging circuit is configured to perform a second change of the charging state of a battery charging operation from the first state to the second state in response to a detected battery voltage level exceeding a first threshold voltage level that is higher than the second threshold voltage level.

9. The circuit of claim 8 wherein the first charging circuit further comprises a status output indicative of occurrence of a fault event and the second charging circuit further comprises an enable control input to enable or disable a battery charging operation in the second charging circuit, the status output of the first charging circuit connected to the enable control input of the second charging circuit.

10. The circuit of claim 8 wherein, in the first charging circuit and the second charging circuit, the battery charging operation operates in a constant current charging state and in a constant voltage charging state.

11. The circuit of claim 10 wherein the battery charging operation in the first charging circuit begins in the constant current charging state and switches to the constant voltage charging state subsequent to the detected battery voltage level exceeding the first threshold voltage level, and the battery charging operation in the second charging circuit begins in the constant current charging state and switches to the constant voltage charging state subsequent to the detected battery voltage level exceeding the second threshold voltage level.

12. The circuit of claim 8 wherein the first charging circuit and the second charging circuit, each, further comprises a respective voltage regulator to generate charging power output by the respective charging output.

13. The circuit of claim 12 wherein the first charging circuit and the second charging circuit, each, further comprises a respective battery FET connected an output of the respective voltage regulator, an output of the battery FET of the first charging circuit and an output of the battery FET of the second charging circuit being connected to the battery terminal.

14. The circuit of claim 12 wherein each respective voltage regulator is a buck converter.

15. A circuit comprising:
   first means for generating power, the first means comprising output means for providing power to a battery to be charged; and
   second means for generating power, the second means comprising output means for providing power to the battery to be charged,
   wherein the output means of the first means and the output means of the second means being connected together, and wherein the first means and the second means collectively charge the battery;
   the first means further comprising means for controlling a battery charging operation thereof based on comparing a detected battery voltage value with a first battery threshold voltage value,
   the second means further comprising means for controlling a battery charging operation thereof based on comparing the detected battery voltage value with a second battery threshold voltage value,
   the first battery threshold voltage value being different from the second battery threshold voltage value.

16. The circuit of claim 15 wherein the battery charging operation in the second means terminates before the battery charging operation in the first means.

17. The circuit of claim 15 wherein the first means and second means, each, includes a voltage regulator.

18. The circuit of claim 17 wherein the voltage regulator in the first means and second means is a buck regulator.

19. The circuit of claim 15 wherein the first means and second means, each, includes a voltage sensor to detect battery voltage.

20. The circuit of claim 15 wherein the battery charging operation in the first means and in the second means, each, includes a constant current mode and a constant voltage mode.

21. The circuit of claim 20 wherein the battery charging operation in the first means and in the second means, each, begins in the constant current mode and subsequently switches to the constant voltage mode.

22. The circuit of claim 20 wherein the battery charging operation in the first means and in the second means, each, switches from the constant current mode to the constant voltage mode in response to the detected battery voltage value exceeding the first battery threshold voltage value and the second battery threshold voltage value, respectively.

\* \* \* \* \*